US006795114B1

(12) United States Patent
Johnson et al.

(10) Patent No.: US 6,795,114 B1
(45) Date of Patent: *Sep. 21, 2004

(54) FILM UNIT DRIVE ASSEMBLY FOR A DETACHABLE ELECTRONIC PHOTOGRAPHIC PRINTER AND CAMERA

(75) Inventors: Bruce K. Johnson, North Andover, MA (US); Magaret A. Obermiller, Wayland, MA (US); Unhyi Yang, San Jose, CA (US); Chin-Loo Lama, Bolton, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,023

(22) Filed: Jan. 31, 2000

(51) Int. Cl.[7] .................. H04N 5/225; H04N 1/034
(52) U.S. Cl. .................. 348/207.2; 348/375; 347/3
(58) Field of Search .................. 348/207.2, 160, 348/375, 376, 552; 347/104, 2, 3, 6, 8

(56) References Cited

U.S. PATENT DOCUMENTS

| 2,977,226 A | 3/1961 | Land .................. 96/3 |
|---|---|---|
| 2,991,703 A | 7/1961 | Eloranta .................. 95/13 |
| 3,165,048 A | 1/1965 | Hamilton .................. 95/89 |
| 3,222,170 A | 12/1965 | Eloranta .................. 96/29 |
| 3,241,468 A | 3/1966 | Wolff .................. 95/13 |
| 3,245,335 A | 4/1966 | Sable .................. 95/89 |
| 3,416,427 A | 12/1968 | Murphy .................. 95/89 |
| 3,625,129 A | 12/1971 | Van Allen .................. 95/89 R |
| 3,647,441 A | 3/1972 | Bachelder .................. 96/29 |
| 3,742,834 A | 7/1973 | Thoenen .................. 95/13 |
| 3,776,118 A | 12/1973 | Driscoll et al. .................. 95/89 |
| 3,777,647 A | 12/1973 | Land .................. 95/89 |
| 3,779,144 A | 12/1973 | Paglia .................. 95/14 |
| 3,779,770 A | 12/1973 | Alston et al. .................. 96/76 C |
| 3,829,871 A | 8/1974 | Gold .................. 354/86 |
| 3,832,731 A | 8/1974 | Kinsman .................. 354/304 |
| 3,852,781 A | 12/1974 | Erlichman .................. 354/86 |
| 3,877,042 A | 4/1975 | Douglas .................. 354/86 |
| 3,925,800 A | 12/1975 | Whall .................. 354/301 |
| 3,943,786 A | 3/1976 | Mills .................. 74/384 |
| 4,016,578 A | 4/1977 | Friedman .................. 354/86 |
| 4,020,498 A | 4/1977 | Friedman .................. 354/86 |
| 4,047,192 A | 9/1977 | Johnson et al. .................. 354/83 |
| 4,087,831 A | 5/1978 | Bendoni |
| 4,104,669 A | 8/1978 | Friedman .................. 354/304 |
| 4,134,655 A | 1/1979 | Friedman .................. 354/86 |
| 4,174,164 A | 11/1979 | Friedman et al. .................. 354/86 |
| 4,247,180 A | 1/1981 | Norris .................. 352/82 |
| 4,253,757 A | 3/1981 | Frieman et al. .................. 354/304 |
| 4,319,827 A | 3/1982 | Carter et al. .................. 354/306 |
| 4,558,936 A | 12/1985 | Petersen .................. 354/86 |
| 4,568,167 A | 2/1986 | Sorli .................. 354/304 |
| 4,811,118 A | 3/1989 | Katoh et al. .................. 358/311 |
| 4,823,154 A | 4/1989 | Sturgis .................. 354/86 |

(List continued on next page.)

FOREIGN PATENT DOCUMENTS

| JP | 10239779 A | * 9/1998 | .......... G03B/27/32 |
|---|---|---|---|
| JP | 10341406 A | * 12/1998 | .......... H04N/5/91 |
| JP | 11298836 A | * 10/1999 | .......... H04N/5/765 |

*Primary Examiner*—Wendy R. Garber
*Assistant Examiner*—John M Villecco

(57) ABSTRACT

A readily portable imaging system for use in the field and, more particularly to an electronic camera and electronic printer housed and readily connectable with respect to each other in the field, and wherein the electronic printer includes a film unit drive assembly that advances the film unit (self-developing type) past a stationary print head for emitting consecutive lines of image data on the film unit to effect progressive exposure on the film unit simultaneously as a fluid spread system spreads the processing fluid over the film unit to effect processing of exposed portions of the film unit.

11 Claims, 26 Drawing Sheets

U.S. PATENT DOCUMENTS

| | | | |
|---|---|---|---|
| 4,839,676 A | | 6/1989 | Lippert et al. ................. 354/86 |
| 4,847,632 A | | 7/1989 | Norris ......................... 346/107 |
| 4,855,769 A | | 8/1989 | Slavitter et al. ............... 354/21 |
| 4,937,676 A | * | 6/1990 | Finelli et al. ................ 348/375 |
| 5,032,911 A | | 7/1991 | Takimoto ..................... 358/76 |
| 5,049,907 A | | 9/1991 | Fraser et al. ................. 354/86 |
| 5,151,728 A | | 9/1992 | Hendry et al. ................ 354/83 |
| 5,473,370 A | | 12/1995 | Moronaga et al. .......... 348/231 |
| 5,715,234 A | | 2/1998 | Stephenson et al. ........ 396/429 |
| 5,715,492 A | | 2/1998 | Stephenson ................. 396/429 |
| 5,721,966 A | | 2/1998 | Campbell, Jr. et al. ....... 396/42 |
| 5,724,155 A | | 3/1998 | Saito .......................... 358/402 |
| 5,864,390 A | | 1/1999 | Johnson et al. ............... 355/67 |
| 5,894,326 A | * | 4/1999 | McIntyre et al. ........... 348/375 |
| 5,982,592 A | | 11/1999 | Saito et al. ............ 360/130.31 |
| 5,990,498 A | | 11/1999 | Chapnik et al. .............. 257/99 |
| 6,014,202 A | | 1/2000 | Chapnik et al. .............. 355/67 |
| 6,091,909 A | * | 7/2000 | McIntyre et al. ........... 348/375 |
| 6,317,156 B1 | * | 11/2001 | Nagasaki et al. ........... 348/373 |
| 6,317,561 B1 | * | 11/2001 | Kniazzeh et al. ............. 396/30 |
| 6,330,397 B1 | * | 12/2001 | Johnson et al. ............... 396/32 |
| 6,657,657 B1 | * | 12/2003 | Sato ....................... 348/207.2 |

* cited by examiner

FILM EXIT SLOT

FILM UNIT DRIVE ASSEMBLY FOR A DETACHABLE ELECTRONIC PHOTOGRAPHIC PRINTER AND CAMERA

CROSS-REFERENCES TO RELATED APPLICATIONS

This application is related to commonly owned U.S. patent application Ser. No. 08/703,985 entitled "Optical System for Use in a Photographic Printer", now U.S. Pat. No. 5,864,390; U.S. patent application Ser. No. 08/931,732 entitled "Apparatus for Reducing Linear Artifacts in Optically Printed-Image", now U.S. Pat. No. 5,982,529; U.S. patent application Ser. No. 08/931,571 entitled "Optical System for Transmitting A Graphical Image", now U.S. Pat. No. 6,014,202; U.S. patent application Ser. No. 08/931,252 entitled "Light-Emitting Diode Having Uniform Irradiance Distribution", now U.S. Pat. No. 5,990,498; U.S. patent application Ser. No. 08/929,972 entitled "Optical System for Use in a Photographic Printer"; U.S. patent application Ser. No. 08/931,570 entitled "Print Head Drive Assembly"; U.S. patent application Ser. No. 08/931,351 entitled "Retractable Print Medium Tray for Use in an Optical Printer"; U.S. patent application Ser. No. 09/409,795 (being a Divisional of Ser. No. 08/931,571) entitled "Optical System for Transmitting a Graphical Image" and U.S. patent application Ser. No. 07/308,644, entitled "Electronic Camera System with Detachable Printer", now U.S. Pat. No. 4,937,676 of which all of above listed applications and patents are incorporated herein by reference.

This application is also related to commonly owned co-pending U.S. patent application Ser. No. 09/495,025 entitled "Processing Fluid Spread System for an Electronic Photographic Printer and Camera"; U.S. patent application Ser. No. 09/495,029 entitled "Film Unit Drive Assembly for an Electronic Photographic Printer and Camera and Related Method Thereof"; U.S. patent application Ser. No. 09/495,026 entitled "Processing Fluid Spread System for a Detachable Electronic Photographic Printer and Camera"; U.S. provisional application Ser. No. 60/179,224 entitled "Cylindrical Mirror Aperture Stop"; and U.S. provisional application Ser. No. 60/179,131 entitled "Electronic Camera System with Modular Printer and Base", each application listed above are concurrently filed with the present application are incorporated herein by reference.

TECHNICAL FIELD OF THE INVENTION

The present invention generally relates to a readily portable imaging system for use in the field and, more particularly, to an electronic camera and electronic printer housed and readily connectable with respect to each other in the field, and wherein the electronic printer comprises a film unit drive assembly that advances the film unit (self-developing type) past a stationary print head for emitting consecutive lines of image data on the film unit to effect progressive exposure on the film unit simultaneously as a fluid spread system spreads the processing fluid over the film unit to effect processing of exposed portions of the film unit.

BACKGROUND OF THE INVENTION

There are numerous types of drive assemblies for photographic printers. One such drive assembly is described in Johnson, U.S. patent application Ser. No. 08/931,570 entitled "Print Head Drive Assembly" of which is a commonly owned co-pending Patent Application. Johnson discloses a print head that is driven by a motor, gear train, and associated wire such that the print head moves one line at a time over the stationary film unit.

In particular, to accomplish the advancement of the print head in Johnson, a worm gear is attached to the motor. The worm gear has worm gear teeth which are spaced such that an integral number, N of rotations of the worm gear corresponds to the distance between consecutive lines of the image, where N can be any integer greater than zero including one.

In mechanical communication with the worm gear is a drive gear. The drive gear is also in mechanical communication with the print head such that movement of the drive gear causes linear motion of the print head. The drive gear has drive gear teeth which interdigitate with the worm gear teeth such that rotation of the worm gear moves the print head by the predetermined amount, which, in turn, moves the print head by the distance between consecutive lines in the image.

The Johnson print head drive assembly advances a print head having static or rigid properties and thus is not susceptible to physical changes or deformations (such as twisting or bending) while it is advanced/driven/transported. While the print head drive assembly of Johnson is entirely satisfactory from a performance standpoint for driving a print head, it does not address the issues of driving a film medium as in the present invention.

Being that a film unit is flexible (compared to the prior art print head), there arises a need in the art for an effective system to drive the film unit past a stationary print head whereby the film unit can be accurately monitored and tracked for any changes or hesitations while it is advanced/driven.

Furthermore, the Johnson print head assembly would not be suited for a portable printing system as in the present invention. The relatively heavy weight of a print head (as opposed to a film unit) makes the print head more susceptible to shock, vibration, and gravitational orientation.

There arises a need in the art for accurately exposing advancing film in a portable printing system that is not susceptible to shock, vibration, and gravitational orientation.

Moreover, with regard to the Johnson print head assembly the transversal of the print head over the stationary film unit requires larger system volume than the present invention.

There arises a need in the art for accurately exposing advancing film in a portable printing system wherein the print head occupies minimal system volume.

Finally, the Johnson Print head assembly requires two motors (spread roller motor and drive gear motor), as opposed to only one motor of the present invention. The additional motor requires extra components and system volume as compared with the present invention. There arises a need in the art for accurately exposing advancing film in a printing system that minimizes the number of components so as to minimize system volume requirements and manufacturing costs.

It is stated in Takimoto, U.S. Pat. No. 5,032,911 entitled "Video Image Printer Using Liquid Crystal Light Valves and Primary Auxiliary Direction Scanning", and herein incorporated by reference, that a printer is coupled to a video camera wherein the film is exposed successively line by line, and is introduced between the squeezing rollers in synchronism with exposure of the film. The Takimoto patent further states that the squeezing rollers serve as a means for spreading processing solutions, and pressing the film there between, while at the same time feeding the film in the auxiliary scanning direction. The Takimoto patent fails to disclose how the feed or scan is accomplished so as to avoid defects in the film's exposure.

Moreover, the Takimoto camera and printer are built as an integral unit and both must be carried into the field together whenever the camera is used even though the camera user may not actually desire hard copy prints in the field.

As disclosed in Finnelli et al., entitled "Electronic Camera System with Detachable Printer", assigned to the same assignee as the present invention and herein incorporated by reference, an electronic imaging system comprises a camera and hard copy printer which can be interconnected for use either in combination or apart. While Finnelli imaging system is entirely satisfactory from a performance standpoint, it does not specifically disclose how the spread process is accomplished.

The primary objects of the present invention is to provide a compact and portable handheld imaging system comprising both an electronic camera and electronic photographic printer separately housed and readily interconnectable for selective use either together or apart; and wherein the film unit drive assembly is providing an accurate system of advancing or driving the film unit while the print head emits consecutive lines of the image data for exposing the film unit.

In particular, the print head is stationery while the film unit is advanced proximately thereto. Once the initial lines on the leading side of the film unit have been exposed then the processing fluid spread system begins to spread the processing fluid in a thin layer between the sheet elements, while the trailing portion of the film unit continues to be exposed. Since the advancing film unit is simultaneously exposed and processed, the processing fluid spread system may affect how smoothly the film unit is advanced. The ability for the film unit to be advanced at a relatively constant rate may be detrimentally affected by the forces created by the processing fluid spread system.

Also, since the present invention involves driving a film unit that has a flexible medium (unlike a rigid print head of the prior art), the film unit is vulnerable to being bent, twisted, or altered as it is advanced through the processing fluid spread system and the film unit drive assembly.

It also should be noted that the processing fluid spread system will need to restrict the liquid wave front, caused by the ruptured container (pod), from encroaching on the line of exposure provided by the stationary print head on the advancing film unit. Thus, the permitted shape and extent (down stream) of the wave front for the fluid processing aspect is significantly less than for the allowable wave front of the prior art.

There is therefore a need in the art for an effective method of driving the film unit so that it may be simultaneously exposed with high accuracy by a stationary print head and processed uniformly by the processing fluid spread system.

Thus, more primary concerns of the present invention involve providing a compact and portable handheld imaging system comprising an electronic camera and electronic printer useable either apart or in connection with respect to each other wherein the printer can provide a high quality photographic print of the image recorded in the camera; wherein the stationary print head effects progressive exposure on the advancing film unit simultaneously as the fluid spread system spreads the processing fluid over the film unit to effect processing of exposed portions of the film unit.

In particular, a need remains for a film unit drive assembly which can minimize the mechanical errors and the film medium deformations and interferences or hesitations imparted by the drive assembly system itself, as well as imparted by the fluid processing spread system. Also, the need arises to be able to monitor the position of the advancing film unit in light of any residual mechanical errors and the film media deformations and interferences that may still persist.

Of course, the above objectives and concerns need to be addressed in an imaging system that would be suitable for portability wherein the system weight is minimal and the system is not susceptible to shock, vibration, and gravitational orientation while in the operating or non-operating modes.

SUMMARY OF THE INVENTION

The present invention is directed generally toward an electronic photographic printer having a film unit drive assembly that advances the film unit (self-developing type) past a stationary print head for emitting consecutive lines of image data on the film unit to effect progressive exposure on the film unit simultaneously as a fluid spread system spreads the processing fluid over the film unit to effect processing of exposed portions of the film unit.

The present invention is directed generally towards a portable imaging system comprising an electronic camera for capturing images, disposed in a camera housing of a size that is conveniently carried by hand. The imaging system further comprising an electronic printer disposed in a printer housing also of a size that is conveniently carried by hand and that is distinct and detachable from the camera housing. The printer includes a film unit drive system and a stationary print head suitable for emitting consecutive lines of an image data on a self-processable film unit to expose the film unit at its image forming area, wherein the lines exposed on the film unit are separated by a predetermined distance, and wherein said exposure occurs while said film unit is being advanced along a transfer path proximately to the print head. The imaging system further comprises a complementary releasable connecting means operatively associated with respect to the camera housing and the printer housing for effecting a releasable fixed connection between the camera housing and the printer housing, the fixed connection also operates to effect an electrical connection between the camera, film unit drive system, and the printer. Also, a memory storage means is provided for storing the image data for each of the camera and the printer. In addition, a microprocessor unit is included having portions disposed respectively within the camera housing and the printer housing. The microprocessor being responsive to user selection for acquiring image data via the camera. The microprocessor is also operable to process the image data for memory storage and film unit exposure and processing.

In particular, the film unit drive system further comprises a motor mounted to the housing. Also included is a pair of transfer rollers comprising a driven transfer roller and a follower transfer roller to provide a transfer nip for advancing the film unit along a transfer path between the pair of transfer rollers. The driven transfer roller has a circumferential speed as effected by the speed of the motor, and the follower transfer roller has a circumferential speed as determined by the speed of the film unit being advanced between the transfer rollers along the transfer path. Also included is a pair of spread rollers comprising an upper roller and lower roller to provide a spread nip for receiving the leading edge of the film unit received from the transfer rollers and for feeding the film unit between the pair of spread rollers to continue the advancement of the film unit along the transfer path, and wherein the spread rollers having circumferential speed as effected by the speed of the motor. Further yet, a gear train is included that couples the motor to at least one of the spread rollers and to the driven transfer roller for transmitting power from the motor to at least one of the spread rollers and to the driven transfer roller to cause the spread rollers and transfer rollers to rotate and advance the film unit along the transfer path. Further included is a drive motor encoder in communication with the motor to control the motor speed so as to effect the circumferential speed of the driven transfer roller and the spread rollers. A film follower encoder is in communication with the follower transfer roller to measure the circumferential movement of the follower transfer roller, as determined by the speed of the film unit being advanced between the transfer rollers, whereby the circumferential movement of the follower transfer roller corresponds with the advancement of the film unit whereby its position respective to the print head can be determined. Finally, the print head is proximally located to the transfer rollers whereby once the leading edge of the film unit advances from the transfer rollers along the transfer path and engages the spread nip of the spread rollers the image forming area of the film unit is then exposed by the print head, wherein the print head emits consecutive lines of image data on the image forming area while the film unit continues to advance, and wherein the exposed lines on the film are separated by the predetermined distance.

An advantage of the present invention is that it provides a readily portable imaging system for use in the field and, more particularly, to an electronic camera and electronic printer housed and readily connectable with respect to each other in the field, and wherein the electronic printer comprises a film unit drive assembly that advances the film unit (self-developing type) past a stationary print head that emits consecutive lines of image data on the film unit to effect progressive exposure on the film unit simultaneously as a fluid spread system spreads the processing fluid over the film unit to effect processing of exposed portions of the film unit.

Another advantage of the present invention film unit drive assembly is that it provides an accurate system of advancing or driving the film unit while the print head emits consecutive lines of the image data for accurately exposing the film unit, with regular spacing of at least 1 μm center-to-center spacing.

A further advantage of the present film unit drive assembly is that it can minimize the mechanical errors and the film medium deformations and interferences or hesitations imparted by the drive assembly system itself, as well as imparted by the fluid processing spread system.

Additionally, another advantage of the present invention is that it provides a compact and portable handheld imaging system comprising both an electronic camera and electronic photographic printer separately housed and readily interconnectable for selective use either together or apart.

Still further, another advantage of the present invention is that it is able to monitor the position of the advancing film unit in light of any residual mechanical errors and the film media deformations and interferences that may still persist.

Moreover, another advantage of the present invention is that LEDs in cooperation with a Spatial Light Modulator (SLM) of a print head provides the image data obtained by the image capture device. Also, the data of the relative location of the film unit with respect to the position of the print head is also determined. This also allows the print head to find the accurate location of the line spaces on the film unit for exposure, whereby the print head configuration and control system provide the means to register all three colors (R, G, B) of a line on top of each other with such high accuracy so as to avoid any kind of impulse artifacts that typically would have been associated with line-to-line spacing errors of prior art devices.

Still yet, another advantage of the present invention is that it is efficient in size and power requirements since the processing and exposing is simultaneously combined during operation. As a result, the system is also cost effective to manufacture. Finally, the system is readily portable for the user to carry.

Thus, an advantage of the present invention is that it provides a compact and portable handheld imaging system comprising an electronic camera and electronic printer useable either apart or in connection with respect to each other wherein the printer can provide a high quality photographic print of the image recorded in the camera; wherein the stationary print head effects progressive exposure on the advancing film unit simultaneously as the fluid spread system spreads the processing fluid over the film unit to effect processing of exposed portions of the film unit.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 9 is a plan view of the film unit drive and processing fluid and spread system sub-assemblies (viewing it from the front side of the housing), with a film unit advanced there between.

FIG. 10 is a plan view of the film unit drive and processing fluid spread system sub-assemblies 400 (opposite view of that of FIG. 9 and viewing from the bottom side of housing) with a film unit advanced there between.

DETAILED DESCRIPTION OF THE PREFERRED EMBODIMENTS

Figure 1:
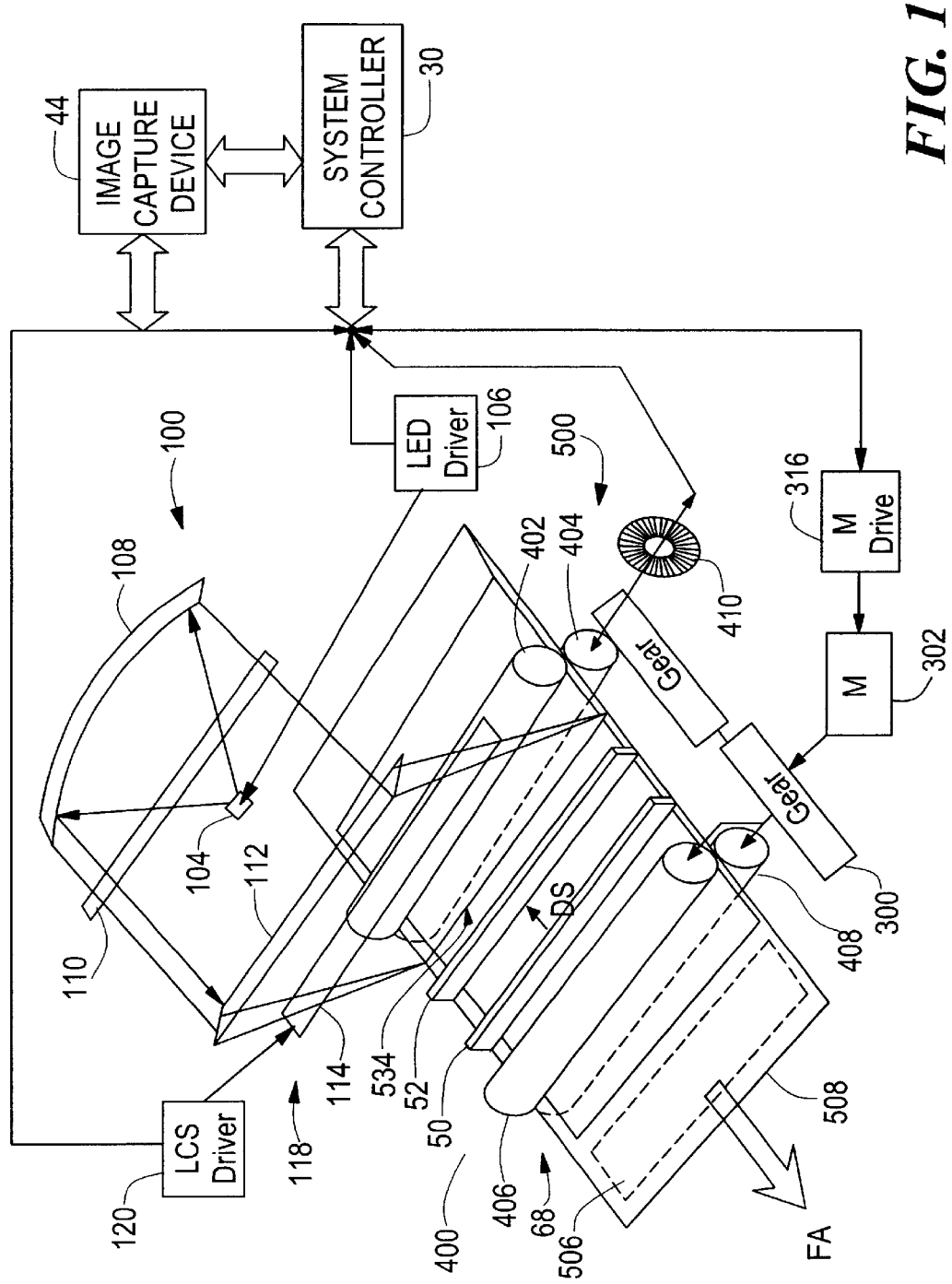
FIG. 1 is a high level schematic diagram of the film unit drive and processing fluid spread system sub-assemblies and the optical assembly.
Figure 2:
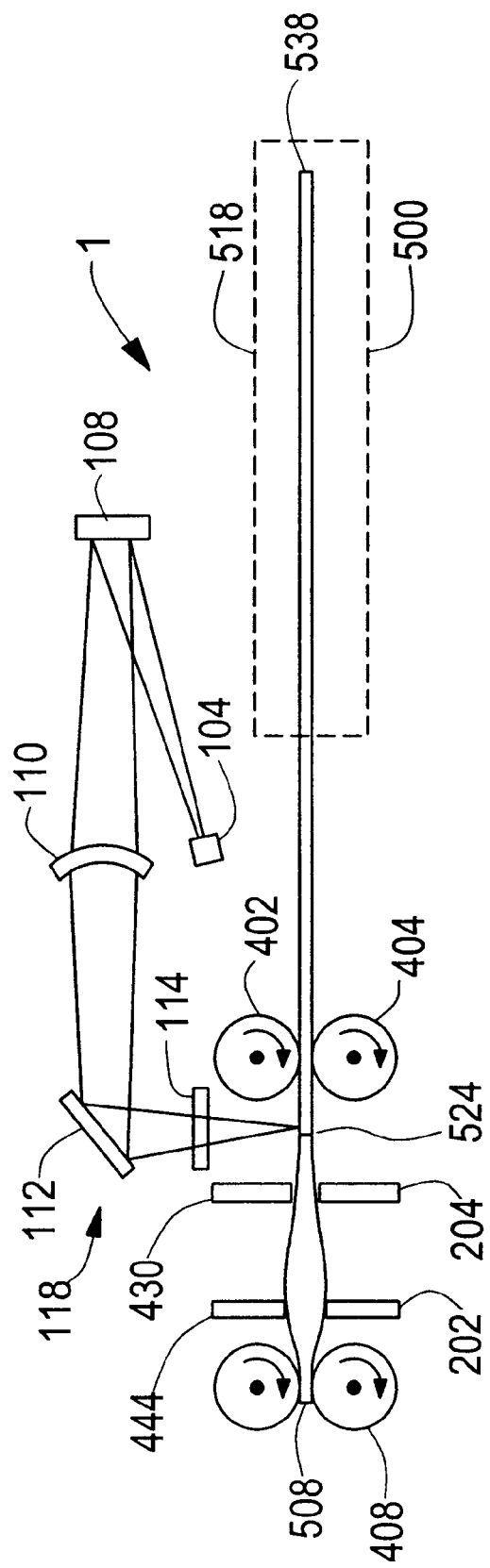
FIG. 2 is a high level sectional view of the film unit drive and processing fluid spread system sub-assemblies and the optical assembly relative to a film unit.

FIGS. 1–3 provide a high level schematic overview of the related electronic printer system. As shown in FIG. 1, the optical assembly 100 has a light source such as LEDs 104 for emitting colored light (R, G, & B) toward a cylindrical mirror 108 which is then reflected in a substantially collimated beam (in one direction) toward a cylindrical lens 110. The cylindrical lens 110 causes the substantially collimated beam of light to coverage along one axis where it is then reflected off a flat mirror 112 and passes through a spatial light modulator such as a liquid crystal shutter (LCS) 114. The spatial light modulator LCS 114 in combination with the flat mirror 112, lens 110, cylindrical mirror 108, and light source 104, serves, generally, as a stationary print head 118 that emits consecutive lines of image data on a self-developing film unit 500 as the film unit 500 is advanced in the direction indicated by arrow FA. The consecutive lines of image data effects lines of exposure 534 on the film unit 500. In essence, the LEDs 104 are activated by the LED driver 106 to provide the light source in cooperation with the LCS 114 that is modulated by an LCS driver 120 according to the data obtained by an image capture device 44, such as an electronic camera.

The cylindrical lens 110 has an integral refractive aperature as disclosed in U.S. provisional application Ser. No. 60/179,224 entitled "Lens with Integral Refractive Aperture". Alternatively, an aperture stop in optical alignment with the cylindrical lens 110 (without the integral aperture) could be provided, as disclosed in U.S. Pat. No. 6,014,202, entitled "Optical System for Transmitting a Graphical Image."

With regards to the mechanism for advancing the film unit 500, a film unit drive and processing fluid spread system sub-assembles 400 is provided. It should be noted that the driven transfer roller 402, follower transfer roller 404, upper spread roller 406, lower spread roller 408, upper clamp 430, clamp arms 432, upper bow 444, transfer roller spacer pads 436, 438, spread roller spacer pads 440, 442, and torsion springs 426, 428, collectively comprise the film unit drive and processing fluid spread system sub-assemblies 400.

Figure 12:
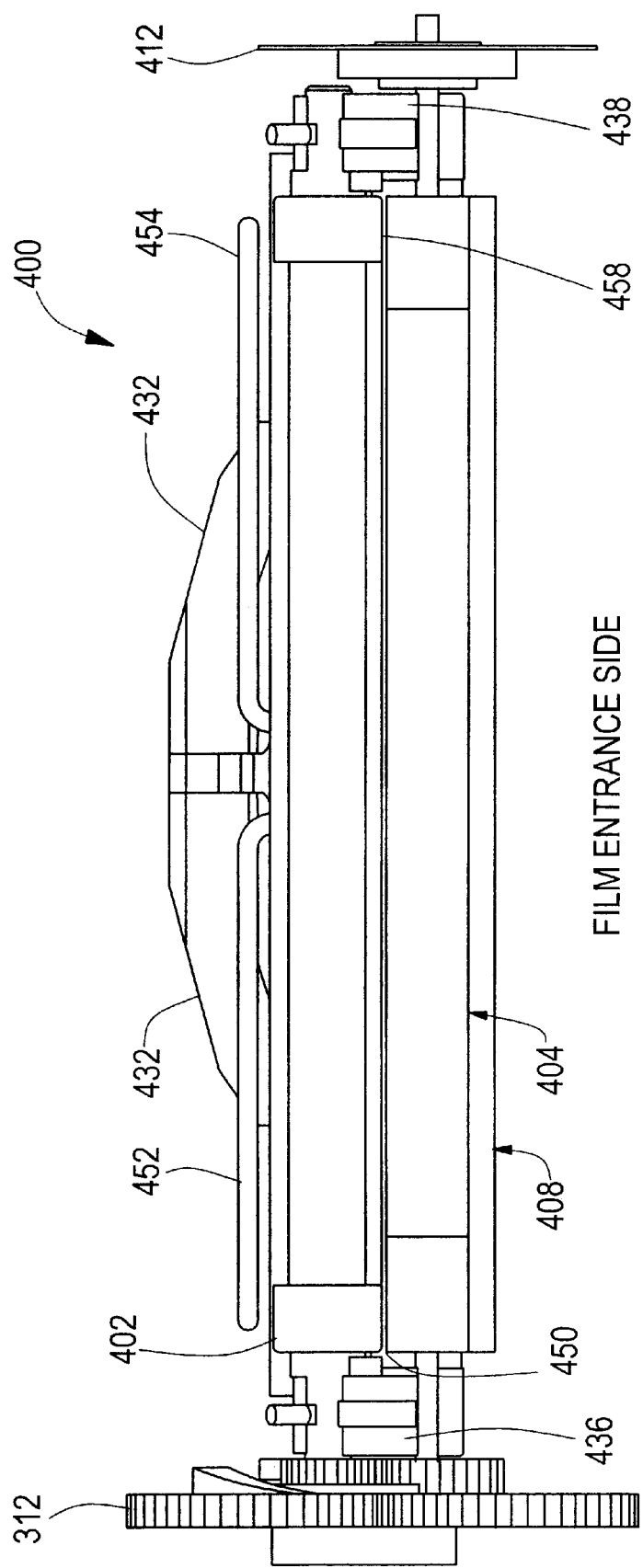
FIG. 12 is an opposite view of FIG. 11 showing an elevation view of the film unit drive and processing fluid spread system sub-assemblies as viewed from the film entrance side of the sub-assemblies.

The pair of transfer rollers comprising a driven transfer roller 402 and a follower transfer roller 404 provide a transfer nip 450 (as shown in FIG. 12) for advancing the film unit 500 along a transfer path between the transfer rollers as indicated by the arrow FA.

Figure 11:
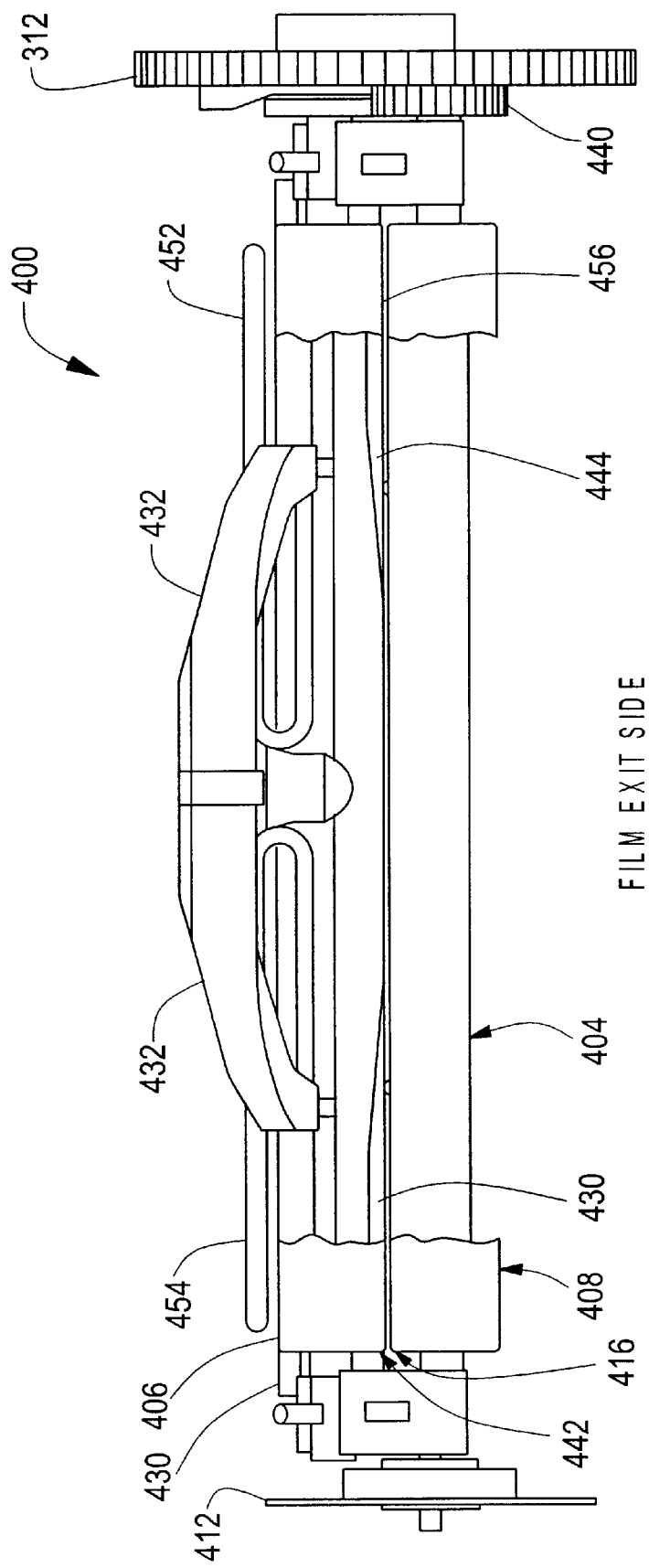
FIG. 11 is an elevation view of the film unit drive and processing fluid spread system sub-assemblies as would be viewed from the top wall of the housing, with the spread rollers partly shown in a cut away section.

The pair of spread rollers comprising the upper spread roller 406 and the lower spread lower 408 that provide a spread nip 416 (as shown in FIG. 11) for receiving the leading edge of the film unit 500 received from the transfer rollers 402, 404. The spread rollers 406, 408 continue feeding the film unit 500 between the pair of spread rollers to continue the advancement of the film unit 500 in the film unit advancement direction as indicated by the arrow FA. A motor 302, driven by a motor driver 316, drives a gear train assembly 300 that drives the upper and lower spread rollers 406, 408. In addition, the gear train assembly 300 also drives the driven transfer roller 402. A film follower encoder 41 (is in communication with the follower transfer roller 404 to measure the circumferential movement of the follower transfer roller 404, as determined by the speed of the film unit 500 being advanced between the transfer rollers. As such, this circumferential movement of the follower transfer roller 404 corresponds with the advancement of the film unit 500 which then allows the film follower encoder 410 to relay to a system controller 30 the relative position of the film unit 500 in respect to the stationary print head 118.

In addition, while the print head 118 is emitting consecutive lines of image data to expose the advancing film unit 500, a processing fluid spread system 400 is spreading the processing fluid of the film unit 500 contained in the rupturable container 506 near the leading edge of the film unit 508. The upper and lower spread rollers 406, 408, serving as a first constraint member 68, apply a first constraint to the film unit 500 to first break the rupturable container 506 so as to the release the processing fluid and then to cause the released mass of processing fluid to flow downstream (as indicated by the arrow DS) between the sheet elements 502, 504 opposite to the direction of the advancement of the film unit (as indicated by the arrow FA). As the film unit 500 is advanced through the upper and lower spread rollers 406, 408 the processing fluid is progressively deposited between the sheet elements 502, 504 as a thin layer extending over a pre-selected area of the sheet elements which has already been exposed by the stationary print head 118.

A second constraint member 50, that includes the upper bow 444 and a lower bow member 202 (to be discussed later), is provided to apply a second constraint to selected portions of the film unit 500 so as to oppose to flow the processing fluid, received downstream from the upper and lower spread roller 406, 408 as the film unit 500 is advanced through the spread rollers 406, 408 so as to cause the processing liquid to flow transversely to the direction of the advancement of the film unit i.e., towards the lateral margins 514 of the film unit 500.

In addition, a third constraint member 52, that includes the upper clamp 430 and lower clamp 204 (to be discussed later), is provided to apply a third constraint to selected portions of film unit 500 so as to oppose the flow of processing fluid received downstream (as indicated by the arrow DS) from the second constraint 50 so as to contain the wave extent or the maximum wave front of the processing fluid within the predetermined longitudinal distance from the upper and lower spread roller 406, 408, whereby this predetermined longitudinal distance defines a wave limit 558. Besides containing the wave front within the wave limit 558, the third constraint member 52 also assists the second constraint member 50 to cause the processing liquid to flow transversely, thus causing the processing liquid to coalesce or merge in a pool. It is critical that the processing fluid is contained within the wave limit 558 so that the processing fluid does not encroach upon the exposure line 534 being emitted by the stationary print head 118 on the advancing film unit 500.

FIG. 2 illustrates the schematic view of the electronic printer system 1 in operation. As illustrated in FIG. 2, a film unit 500 is being advanced by the driven transfer roller 402 and the spread rollers 406, 408, whereby the leading edge 508 of the film unit 500 is engaged in the spread nip 416 of the spread rollers 406, 408 and the leading edge 524 of the image forming area is being exposed by the image data emitted from the stationary print head 118.

Figure 3A:
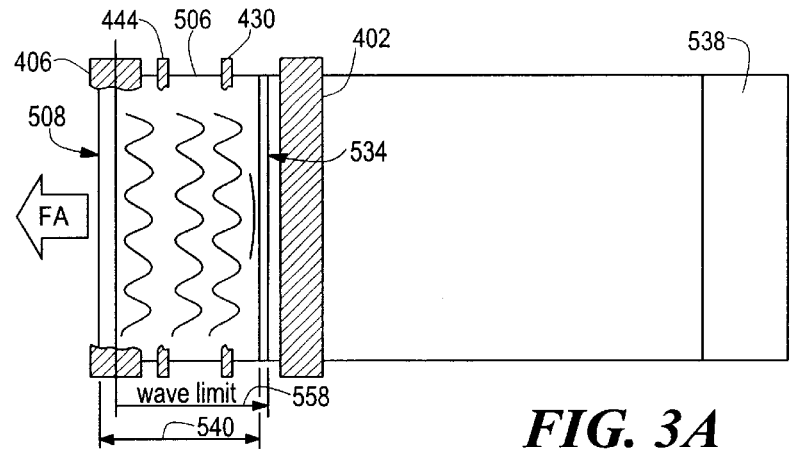
FIGS. 3(A)–(C) are plan views of FIG. 2, showing the progressive advancement of the film unit in relation to the progressive exposure and fluid spreading.

Turning to FIG. 3(A), FIG. 3(A) is a plan view of FIG. 2 showing a film unit 500 being advanced in the direction as indicated by the arrow FA. The wave limit 558 is illustrated as the maximum distance from the center line of the spread rollers 406, 408 by which the processing fluid can extend without encroaching on the exposure line 534. As can be noted, the leading longitudinal margin 516 has a dimensional length, as indicated by reference no. 540, that is slightly longer than the length of the wave limit 558. To aid in the effort of providing a smooth film unit advancement, the leading edge 508 should be engaged with the spread rollers 406, 408 before the print head 118 exposes the initial line(s).

Once the leading edge 508 of the film unit 500 is engaged with the spread rollers 406, 408, the spread rollers 406, 408 in conjunction with the driven transfer roller 408 are able to advance the film unit 500 in a relatively continuous smooth and constant motion. Also once the leading edge 508 of the film unit 500 is engaged with the spread nip 416 of the spread rollers 406, 408 then the print head 118 is activated, whereby LEDs 104 are turned on in sequence and the LCS shutter 114 is modulated to create the proper exposure onto the advancing film unit 500.

Figure 3B:
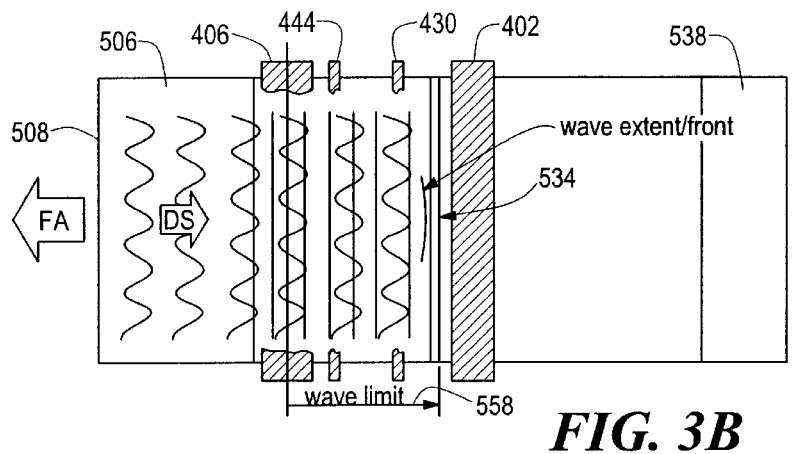

Turning to FIG. 3(B), FIG. 3(B) shows the similar plan view as in FIG. 3(A) except that the film unit has been progressively advanced wherein the print head 118 has exposed approximately half of the image forming area 522 (as depicted by the straight-uniform lines) and the spread system has processed nearly the same area (as depicted by the wavy lines) while still staying within the wave limit 558. One can observe from FIG. 3(B) that the wave limit 558 is a fixed length from the center line of the spread rollers 406, 408 and that the processing fluid wave front must always be contained within, in part by the help of the upper clamp 430 (i.e., third constraint member 52) so as to not encroach on the image line 534.

Figure 3C:
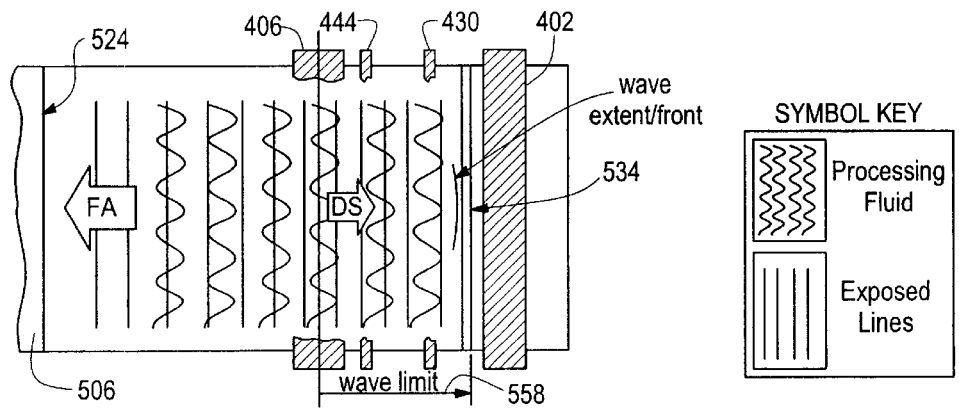

FIG. 3(C) shows the film unit 500 that has been almost completely advanced and which has been almost entirely exposed and processed.

Figure 4:
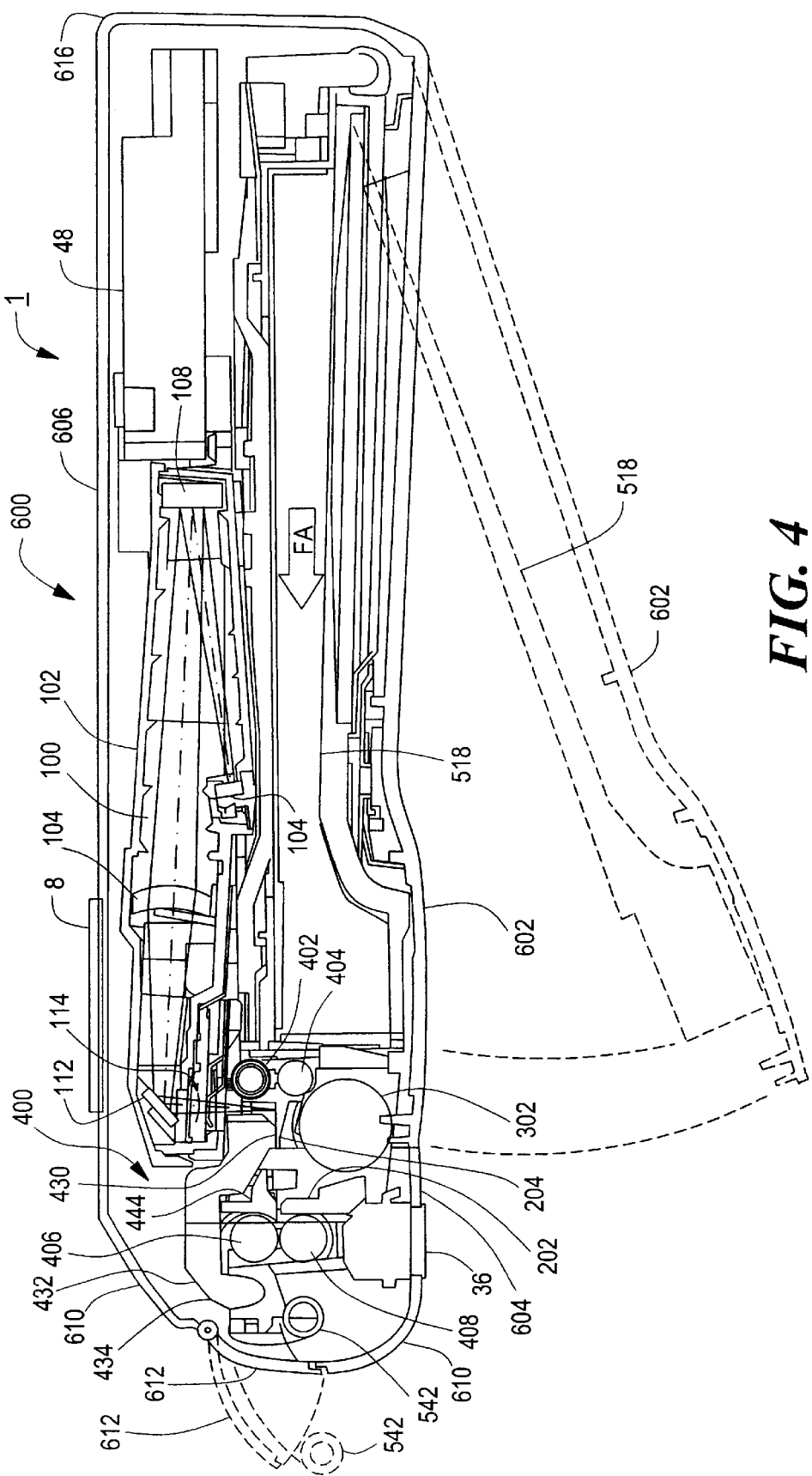
FIG. 4 is a sectional view of the electronic printing system and exterior housing, with film door in an open and closed position.

Referring to FIG. 4, FIG. 4 illustrates a cross sectional view of the electronic printing system 1 comprising a film cassette 518 for holding a stack of film units 500 whereby the film units are advanced into the film unit drive and processing fluid spread system sub-assemblies 400 while being exposed by the optical assembly 100, wherein the film units 500 are then exited through the exit door 612 of the housing 600 and beyond the film shade 542.

The housing 600 generally has a back wall 606, front wall 604, bottom wall 616 and top wall 610 (having an arch-like shape). On the front wall 604 is a film door 602 which makes up in part the front wall 604 when in the closed position. When the film door 602 is in the open position, as designated by the dotted lines, the film cassette 518 can be manually loaded. Also shown is the film exit door 612, which makes up in part the top wall 610, shown in the closed position and the open position, as designated by the dotted lines. Similarly, a film shade 542 is depicted in the closed position and in the partially extended position, also designated by the dotted lines. As will be discussed in greater detail below, film units 500 will be advanced from the film cassette 518 towards the film entrance side of the film unit drive and processing fluid spread system sub-assemblies 400, in the direction indicated by the arrow FA. While the film unit 500 is advanced through the sub-assemblies 400, the film unit will be simultaneously exposed and processed where it will then be exited through the film exit side of the sub-assemblies 400 out past the film exit door 612.

Figure 5:
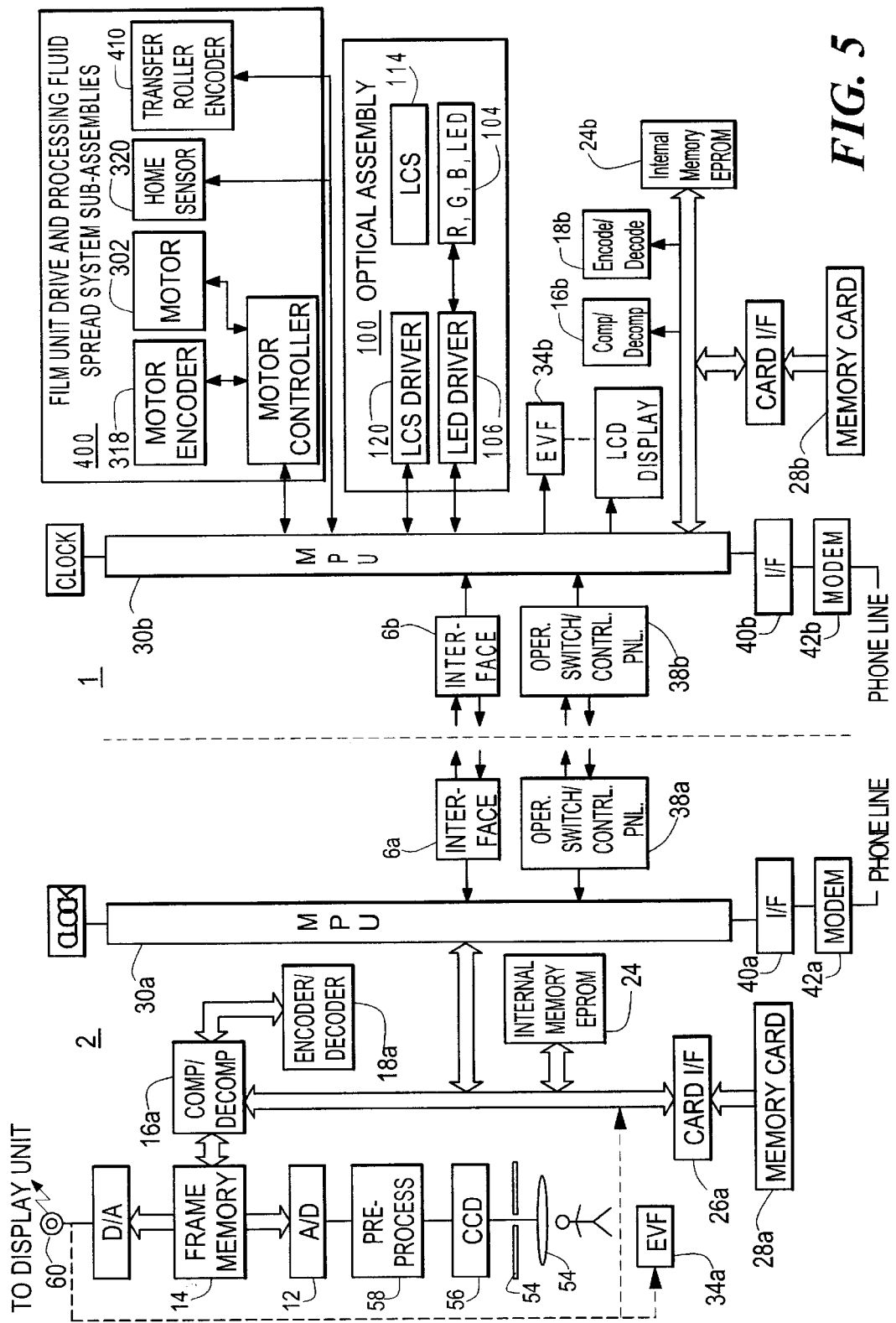
FIG. 5 is a circuit block diagram showing an electronic printing system in communication with the image capturing system.

FIG. 5 is a circuit block diagram of the readily portable imaging system of the present invention showing an electronic printing system 1, in communication with the image capturing system 2, e.g. electronic camera. The image capturing system 2 is intended to be illustrative and not restrictive. With regards to the image capturing system 2 of the present invention the following reference of an electronic camera may be had to Finelli et. al., U.S. Pat. No. 4,937,676, entitled "Electronic Camera System With Detachable Printer", which is assigned to the same assignee as the present invention and is incorporated herein by reference. In addition, references may be had to Saito, U.S. Pat. No. 5,724,155, entitled "Electronic Imaging System" and Moronaga, U.S. Pat. No. 5,473,370, entitled "Electronic Still Video-Camera and Playback Apparatus thereof being Capable of Storing Image Data when the Storage Capacity of a Memory Card is Exceeded", both of which are incorporated herein by reference.

Referring to FIG. 5, the operation of the individual system components of the electronic printer 1 and electronic camera 2 are controlled by their respective microprocessor units (MPU) 30a, 30b. When the electronic camera 2 is in the recording mode, the image of a subject is formed on a solid state electronic image pick-up element such as a CCD 56 through an image optical system comprising an object lens 36 and a shutter 54, for controlling transmission of the incoming light. The electronic image picked up by the CCD 56 is converted into electric signals at the moment a shutter release button (not shown) is pressed. Thereafter, the electric signal is outputted by the CCD 56 as image data representing the image of the subject captured. The output of the CCD 56 is subjected to pre-processing such as amplification and white balance adjustment and a pre-processing circuit 58. The resulting pre-processed digital image data is then converted by the A/D converter circuit 12, and the digital image data is stored temporarily in the frame memory 14 via the MPU 30. The digital image data read out from the frame memory 14 is converted again by D/A converter 20 into analog signals to be sent as video signals through a video encoder (not shown) in the form of a video output terminal 60. The video signal is displayed as the viewfinder image in the electronic viewfinder (EVF) 34, which also operates as the LCD Display 8. One skilled in the art would appreciate that an optical viewfinder could also be used instead of the EVF 34.

In addition, the image data is read out of the frame memory 14 and can be applied to a compression/decompression circuit 16a, such as DCT or inverse DCT (IDCT). The compression circuit 16a compresses the image data by the compression algorithms and expands image data by decompression algorithms. As a result of being in the compressed data format, the amount of data in one frame of image data is reduced, and therefore the number of frames capable of being recorded in an external memory card 28a or an internal memory 24b of the system is increased.

The compressed image data can be read out of the frame memory 14 and applied to the coding/decoding circuit 18a. While the compressed image data is being coded by the coding/decoding circuit 18a, it is directed through a card interface (card I/F) 26a and stored in the external memory card 28a or the internal memory 24a depending upon the selection made by the operator via the operation switches/control panels 38a. The operation switches/control panels is controlled by the MPU 30a.

The above-described exposure interval may be effected in the field with the electronic camera 2 connected to the electronic printer 1 in the manner as previously described. In this case, processed, digitally formatted, and compressed electronic image information signals are directed to a printer interface 6a for transmission by way of the electrical contacts to the electronic printer 1. Alternatively, the above-describe exposure interval could be implemented in the field by the electronic imaging camera 2 without connection to the electronic printer 26a of the camera housing 700 and the processed, digitally formatted, and compressed electronic image information signals are directed for storage in the internal memory 24a.

In the case where the electronic camera 2 and electronic printer 1 are interconnected then it will be understood that the process, digitally formatted and compressed electronic image information signals provided from the electronic camera 2 by way of the interface 6a may be directed by way of another interface 6b in the printer housing 600 for storage in the external memory card 28b. Alternatively, at the camera user's discretion by way of appropriately actuated switches on the control panel 24b there is provided an appropriate signal from the MPU 30b to direct the electronic image information signals received form the electronic camera 2 to a decompression circuit 16b to uncompress the previously compressed electronic image information signals. Also, the image information signals provided by the camera 2 may be directed for storage to internal memory 24b.

In the playback mode, an image frame is read out of external memory 28 or internal memory 24 from the compressed image data stored on these memories. After being subjected to playback processing, the read image data is either displayed in a viewfinder (constituted by a LCD display 8, for example) or applied to an external display unit via the video output terminal 60 or the serial port terminal used for connecting to an external display unit.

In general, the MPU 30 executes control of the memories for compressing and expanding the image data in the manner described above; changeover control of the operator switches/control panels 38: control for changeover between the recording and the play back modes; control for accessing the internal memory 24 and the external memory 28 and designating frame numbers; and control of display menu and controls displayed on the LCD panel or 8/EVF 34.

Also controlled by the MPU 30b is the film unit drive and processing fluid spread system assemblies 400 and the optical assembly 100.

Also, communication with the electronic printing system 1 may be accomplished via the interface I/F 40b and a modem 42b connected to the phone line so that the image data may be transmitted by downloading and uploading over the I/F 40b.

As one skilled in the art would appreciate, the operating switches/control panels 38 entail functions in the image capturing mode such as shutter release, exposure settings, quality settings, and other related image capturing options. With regards to the functions related to the image play-back mode, the playback mode functions, as determined by the operation switches/control panels 38, entail selecting pictures for prints, magnifying pictures, protecting and deleting pictures, and reviewing and printing the photographic pictures. The LCD display 8 may be used for an electronic viewfinder EVF 34 and for reviewing the captured images and displaying the menu options of the various functions.

The camera user by actuating the appropriate switches in either the printer control panel 38b and/or the electronic camera control panel 38a while still in the field can provide the appropriate control signals by way of MPU 30a, 30b, respectively, to effect any one of a combination of the aforementioned functions. For instance, the camera user can direct the electronic information signals for each scene for storage in the memory card 28a. The electronic image information signals can then be recalled for display on the LCD display 8 to determine what images are to be transformed into hard copy. The camera user can have the further option of storing none of the electronic image information signals in the memory card 28a but instead directing the signals to provide immediate hard copies. Alternatively, the user may decide not to print any hard copied in the field at all but instead direct all images for storage in the memory card 28b. He can then disconnect the electronic imaging camera 2 from printer 1 and take the printer to any convenient place, i.e., office, home, etc., where he can proceed to retrieve the previously recorded images from the memory card 28b for viewing on the LCD display 8 and printing of selected images at his discretion.

Alternatively, the electronic camera 2 may be taken into the field (without the camera) with its memory card 28a or utilizing its internal memory 24a for more convenient carrying and handling. The electronic camera 2 with the memory 28a or 24a in the aforementioned manner can the be utilized to record a plurality of scenes which are ultimately stored in its memory 24a or 28a. The memory card 28a may thereafter be removed from the camera housing 700 and connected to the printer housing 600 in the aforementioned manner whereupon the user can selectively view and print images previously recorded by the camera. Thus, in this manner there is provided portable imaging system having tremendous versatility and capability by providing immediate hard copies in the filed or alternatively permitting the recording of images electronically in the field with a small compact camera and the subsequent selective viewing and printing of such recorded images in the comfort of the user's home.

Figure 6:
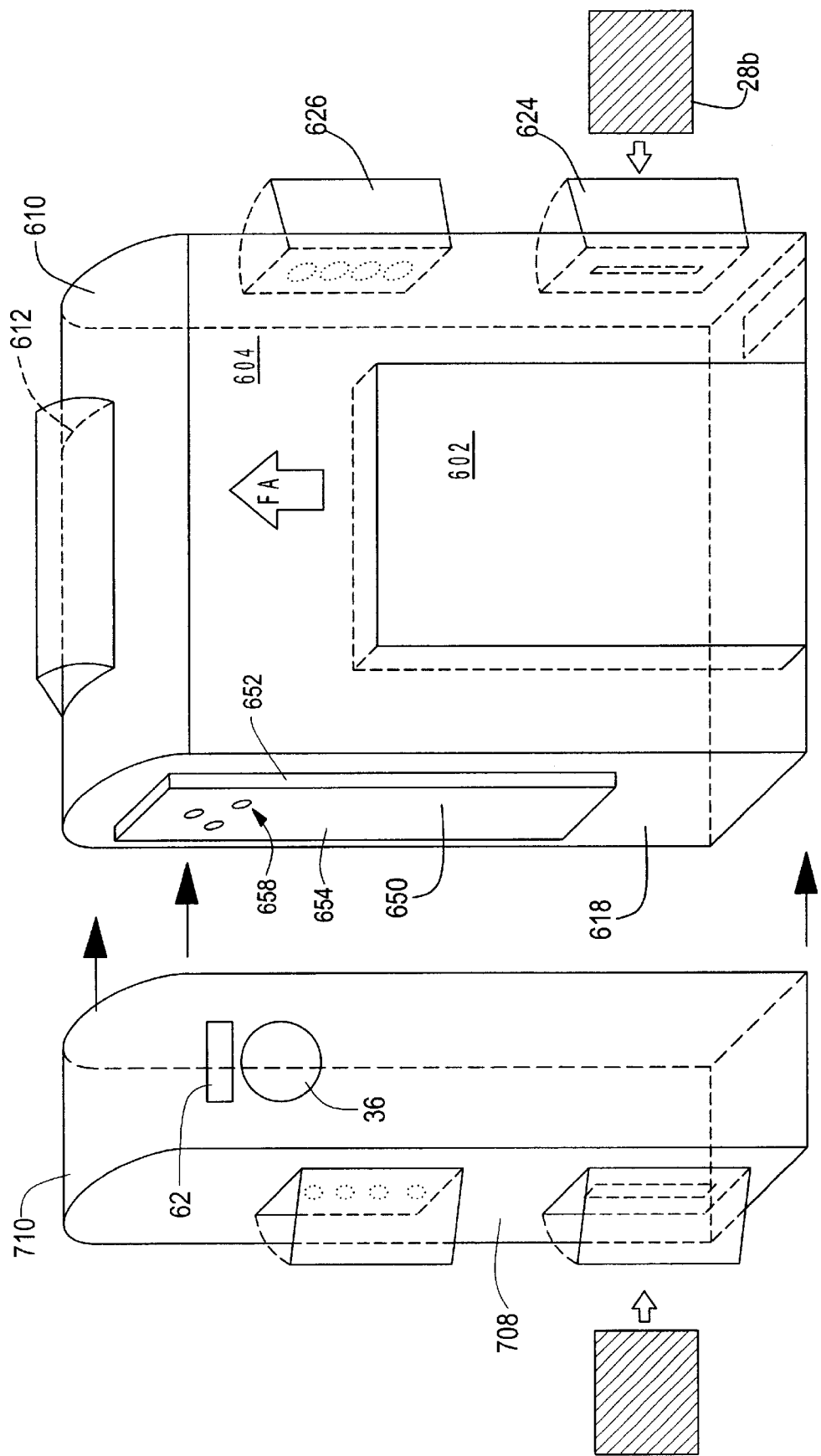
FIG. 6, illustrates a front-side perspective view of the present invention electronic printer housing and camera housing detached from one another.
Figure 7A:
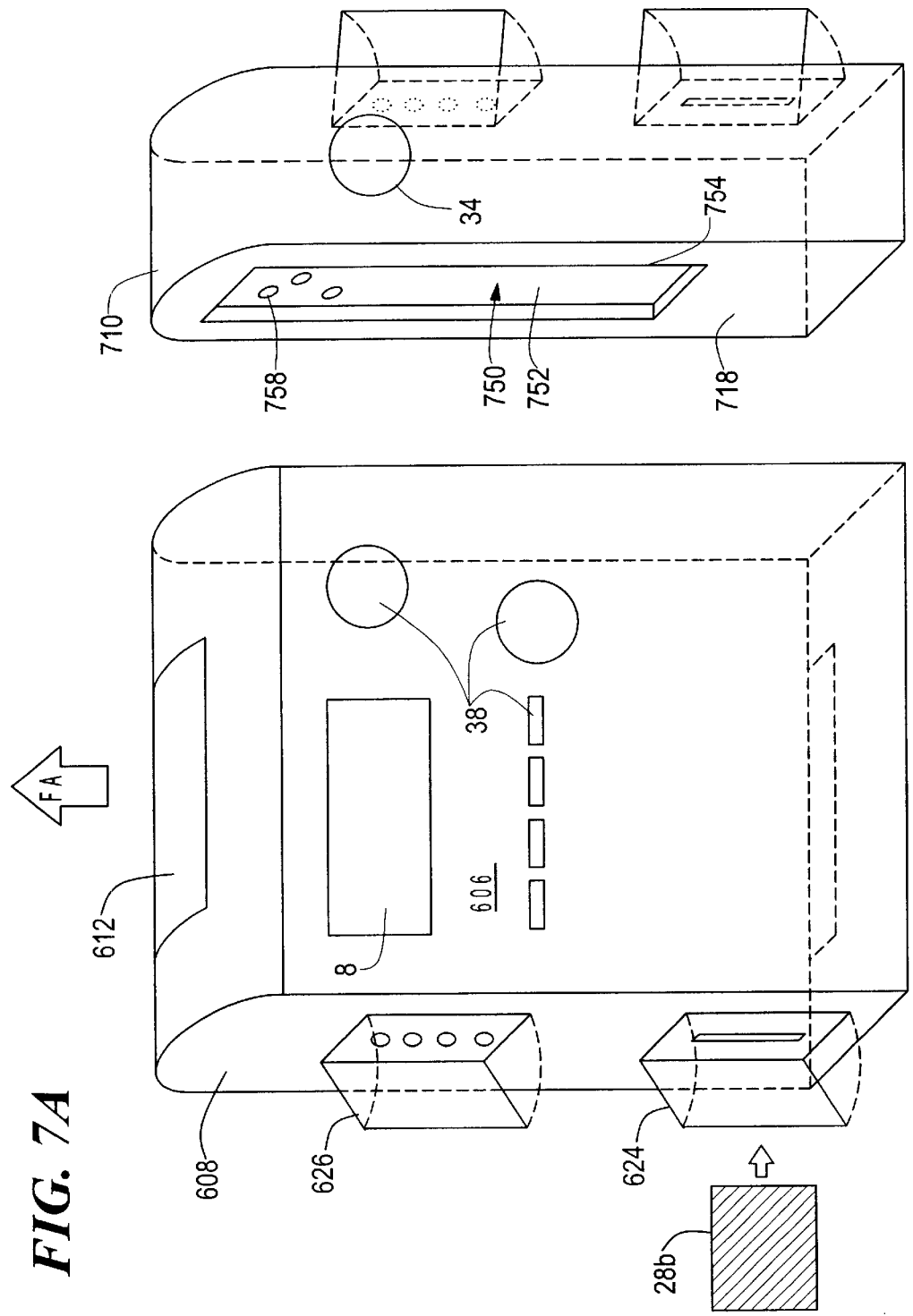
FIG. 7(A) illustrates a back-side perspective view of the present invention electronic printer housing and camera housing detached from one another.
Figure 7B:
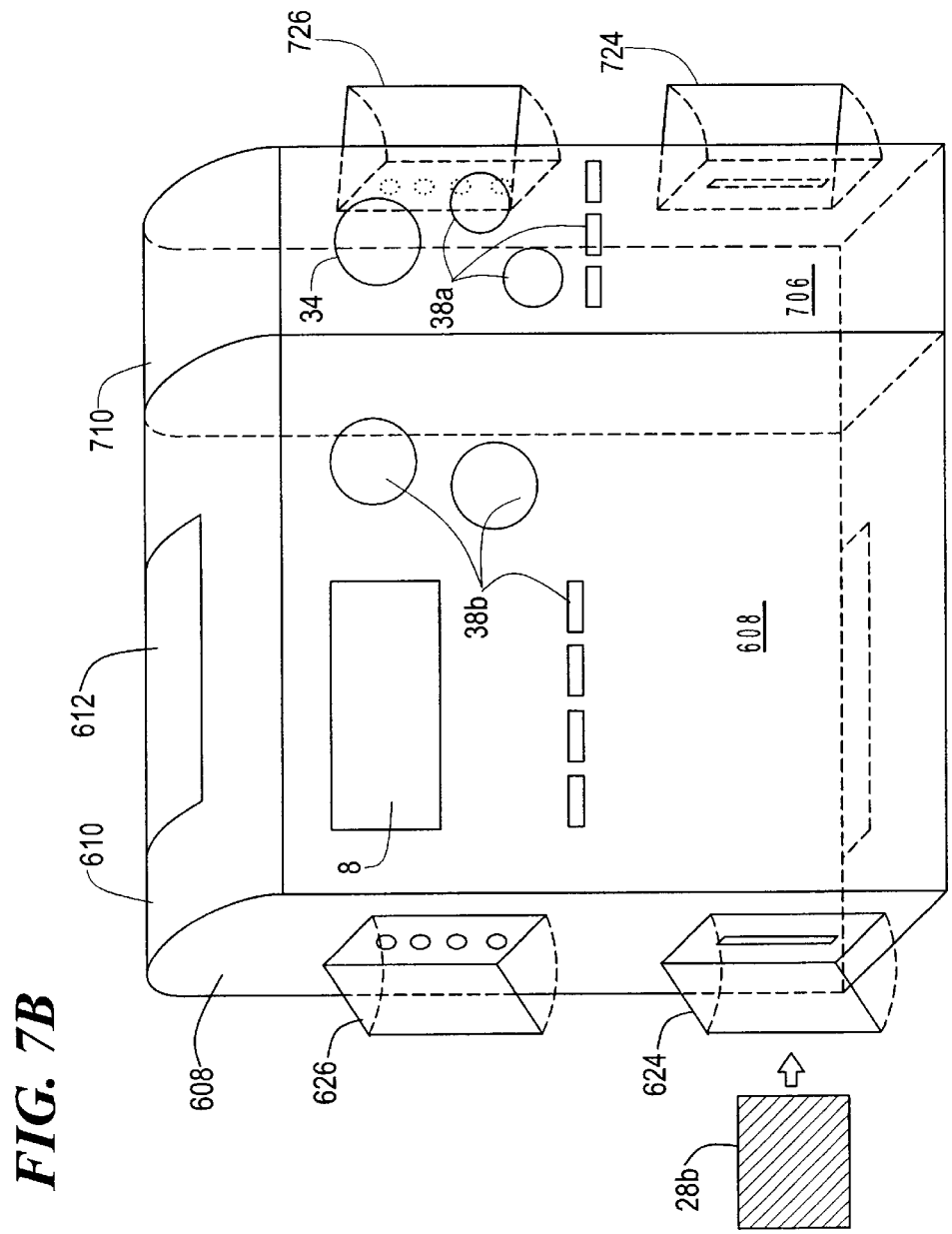
FIG. 7(B) is the same view as FIG. 7(A), except that the housing are interconnected.

Referring to FIGS. 6 through 7, there is shown the portable imaging system of the present invention comprising the electronic camera 2 disposed in the camera housing 700 and the electronic printer disposed 1 in the printer housing 600.

Referring to FIG. 6, there is shown the camera housing 700 and the printer housing 600 detached from one another. The camera housing 700 is defined by a generally parallelepiped structure except that the top wall 710 is arch-like shaped. Still referring to the camera housing 700, there is shown a bottom wall 716 (as indicated by dotted lines). The top and bottom walls 710 and 716 are interconnected by substantially planar parallel front and back walls 704, 706 and substantially parallel planar slide walls 708 and 718. The electronic flash 62 and the object lens or zoom lens 36 is also disposed on the front wall 704, wherein on the upper portion of the side wall 708 there is disposed a connection port door 726 having four port connections which include the video output terminal 60a, the interface (I/F) terminal 40a, the serial port connector 64a, and finally the power port connector 66a. On the lower portion of the side wall 708 there is disposed the memory card door 724 wherein the card interface (card I/F) 26a is disposed, whereby the external memory Still referring to FIG. 6, there is shown the printer housing 600 as defined by a substantially parallelepiped structure having a top wall 610, with an arched-like shape, with the exit door 612 disposed thereon (dotted lines on the exit door 612 indicating the open position) wherein the film unit 500 exits out of the film exit door 612 in the direction as indicated by arrow FA. Also disposed on the front wall 604 is the film door 602 mounted thereon (and is included as part of the front wall 604) where the film cassette 518 can be manually loaded by opening the film door 602. The housing 600 has two respective side walls marked as 608 and 618. On the upper portion of the side wall 608 there is disposed a connection port door 626 having four port connections which include the video output terminal 60b, the interface (I/F) terminal 40b, the serial port connector 64b, and finally the power port connector 66b. On the lower portion of the opposite respective side wall 606 there is disposed the memory card door 624 wherein the card interface (card I/F) 26b is disposed, whereby the external memory card 28b is received.

Next, referring to FIGS. 7(A), (B), there is illustrated a back wall 706 of the camera housing 700 having EVF 34 as well the operation switches/control panels, generally indicated as reference no. 38a, wherein these switches and controls are generally known to those skilled in the art and have been briefly discussed above. This view also shows the memory card door 724 and the connection port door 726 mounted on the side wall 708.

Still referring to FIGS. 7(A) and (B), there is illustrated a back wall 606 of the printer housing 600 having a LCD display 8 as well the operation switches/control panels, generally indicated as reference no. 38b, wherein these switches and controls are generally known to those skilled in the art and have been briefly discussed above. This view also shows the memory card door 624 and the connection port door 626 mounted on the side wall 608, as well as the film exit door 612 mounted on the top wall 610 (direction of the film advancement is generally indicated by the arrow FA).

For examples of releasable complimentary connecting means associated with camera and printer housings, as well as to overall system electronics, reference may be had to Finnelli, U.S. Pat. No. 4,937,676, entitled "Electronic Camera System with Detachable Printer"; Stephenson, U.S. Pat. No. 5,715,492, entitled "Electronic Camera and Associated Printer with Light Shutter"; Stephenson et al., U.S. Pat. No. 5,175,234, entitled "Electronic Camera and Associated Printer which Uses a Display Image"; and Katoh et al., U.S. Pat. No. 4,811,118, entitled "Detachable Unit Electronic Camera", of which all of the above patents are herein incorporated by reference.

Complementary releasable connecting means operatively associated with respect to the camera and printer housing 700, 600 are provided for effecting a releasable fixed connection between the camera and the printer housing so that both the electronic camera 2 and the electronic printer 1 can be operated together in the manner of the present invention. The releasable connecting means preferably comprises a raised elongated tongue member 650 extending outwardly from the side wall 618 and comprising a pair of spaced apart substantially parallel beveled side walls 652 and 654. The tongue member 650 also comprises a substantially planar top surface portion 656 upon which are disposed a plurality of electrical contacts as shown at 658.

That portion of the releasable connecting means operatively associated with the electronic camera 2 is best shown in FIG. 7(A) as comprising an elongated recessed groove 750 having substantially parallel beveled side walls 752, 754. Within the groove 750 there are provided a plurality of electrical contacts as shown at 758. Physical and electrical interconnection between the camera housing 700 and the printer housing 600 is effected by longitudinally sliding the elongated tongue member 650 of the printer housing 600 into the recessed groove 750 in the camera housing 700. As is readily apparent the beveled side walls 652, 654 of the raised tongue member 650 engage the complimentary beveled side walls 752, 754, respectively, to maintain the camera and printer housings 700, 600 in fixed connection with respect to each other. In addition, electrical connection is established between the camera and printer housings 700, 600 by the electrical contacts 658 engaging respective corresponding ones of the electrical contacts 758. It will be readily understood that the sliding motion of the electrical contacts 658, 758 over each other which occurs in concert with the sliding movement of the complementary tongue and groove members during camera and printer connection and disconnection respectively operates to wipe clean the electrical contacts thereby insuring a reliable positive electrical connection each time the camera and printer are connected.

Figure 8:
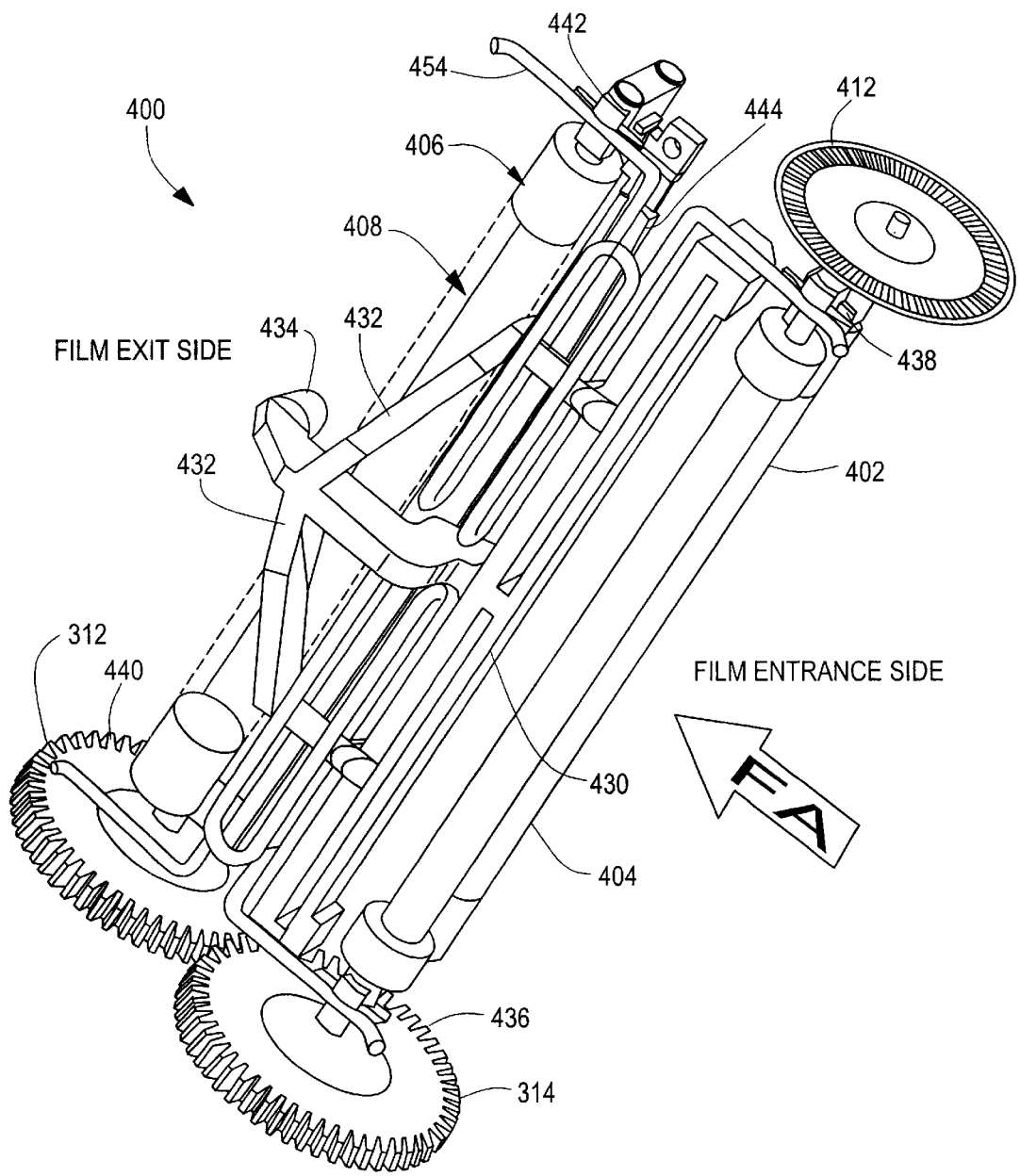
FIG. 8 is a perspective view of the film unit drive and processing fluid spread system sub-assemblies.

FIG. 8 illustrates a perspective view of the film unit drive and processing fluid spread system sub-assemblies 400 for which the film units, advancing in the film advancement direction as designated by arrow FA, enter the film entrance side of the sub-assemblies 400 and exits opposite at the film exit side. The film unit drive and processing fluid spread system sub-assemblies 400 include the driven transfer roller 402 in a juxtaposed relationship with the follower transfer roller 404. On the axis of the follower transfer roller 404 is the encoder wheel 412 and on the axis of the driven transfer roller 402 is the transfer roller gear 314. Also shown is the upper spread roller 406, in a partial cut away view, and the lower spread roller 408 in a juxtaposed relationship with the upper spread roller 406. Located on the axis of the lower spread roller 408 is the spread roller gear 312. Also shown is the upper clamp 430 having upper clamp arms 432 connecting to a clamp mount 434 which would be pivotally mounted to the main frame 200 (not shown). An upper bow member 444 is also shown. Also shown is a spring system 446 that includes a first torsional spring 452 and a second torsional spring 454 adapted for applying pressure on the upper spread roller 406(at the vicinity of the spread roller spacer pads 440, 442), the upper clamp 430 (at the vicinity of the two outer arms 432) and the driven transfer roller 402 (at the vicinity of the transfer roller spacer pads 436, 438).

Figure 9:
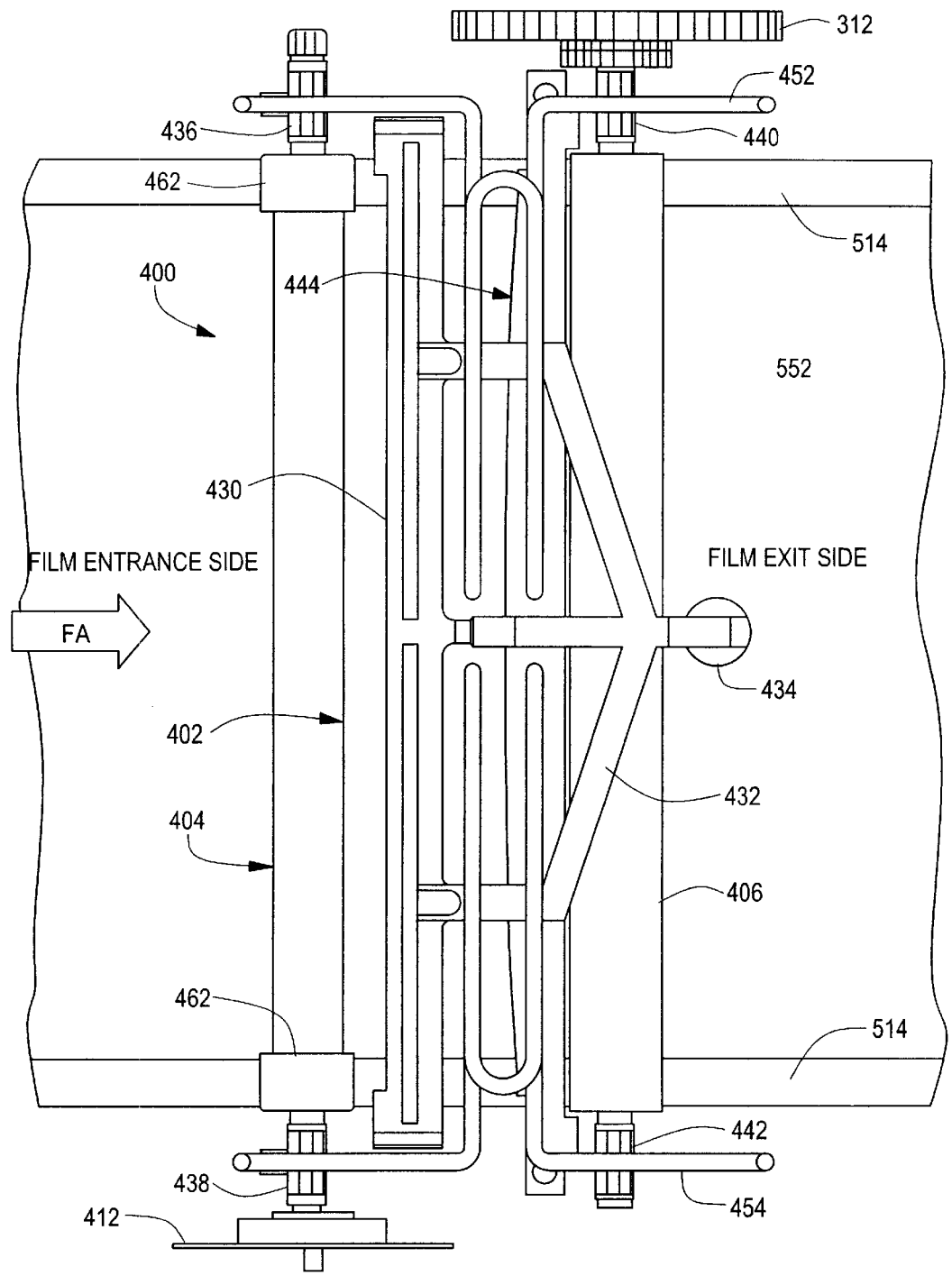

FIG. 9 illustrates a plan view of the film unit drive and processing fluid and spread system sub-assemblies 400 (i.e., viewing it from the front side of the housing 600), wherein the film unit 500 would be advanced in the direction indicated by the arrow FA starting from the film entrance side of the sub-assemblies 400 and exiting out of the sub-assemblies 400 at the film exit side. It can be noted, that the torsional springs 452, 454 exert pressure on the upper spread roller 406 at the spread roller spacer pads 440, 442, respectively. Also, the torsional springs 452, 454, exert pressure on the upper clamp 430 through the two outer arms 432 of the upper clamp 430. Finally the torsional springs 452, 454 also apply forces on the driven transfer roller 402 at the transfer rollers spacer pads 436, 438, respectively.

Still referring to FIG. 9, the driven transfer roller 402 has transfer roller collars 462, 464 at its respective ends. These collars 462, 464 form a stepped region or raised shoulder that strategically coincide with the literal margins 514 of the advancing film unit 500. The collars 462, 464, will contact the lateral margins 514 to preclude the remainder of the driven transfer roller 402 from prematurely rupturing the rupturable container 506.

Also, the surface of the collars 462, 464 constitute a high fricture surface so as to prevent the driven transfer roller 402 from slipping on the advancing film unit 500. Some examples of friction treatment are sand blasting, micro knurling, and electro discharge machining (EDM).

Figure 10:
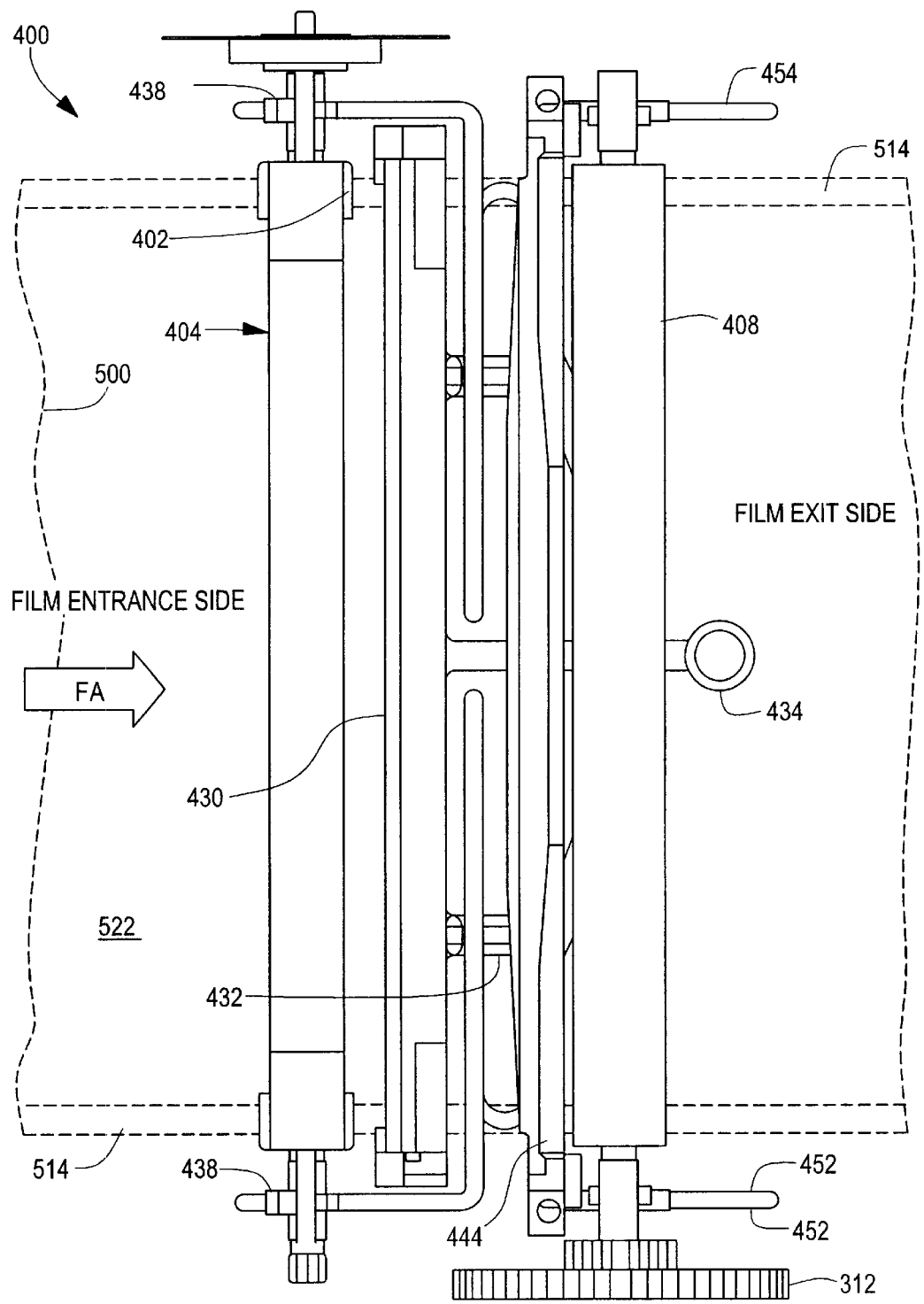

FIG. 10 illustrates the plan view of the film unit drive and processing fluid spread system sub-assemblies 400 (i.e., opposite view of that of FIG. 9) as would be viewed from the bottom side of housing 600. FIG. 10 shows the film entrance side of which the film unit 500 would enter the sub-assemblies 400, as well as the film exit side from which the film unit would exit as the film advances in the direction indicated by arrow FA. Also shown is a schematic view of the film unit 500 (backside of image area 522) being advanced between the follower transfer roller 404 and the driven transfer roller 402, as well as between the lower spread roller 408 and the upper spread roller 406 (not shown) wherein the film unit 500 has its lateral margins 514 respectively shown.

FIG. 11 illustrates an elevation view of the film unit drive and processing fluid spread system sub-assemblies 400 as would be viewed from the top wall 610 of the housing 600 or from the exit side. The upper spread roller 406 and the lower spread roller 408 are partly shown in a cut away section. Spread roller spacer pads 440 and 442, as shown, are adapted to establish the spreader roller pre-gap 456 between the spread rollers 406, 408.

FIG. 12 shows an elevation view (i.e., opposite view of FIG. 11) of the film unit drive and processing fluid spread system sub-assemblies 400 as viewed from the film entrance side of the sub-assemblies 400. Transfer roller spacer pads 436 and 438 are illustrated which establishes the transfer roller pre-gap 458 for spacing the driven transfer roller 402 and follower transfer roller 404 for which the film unit 500 is advanced there between.

Figure 13:
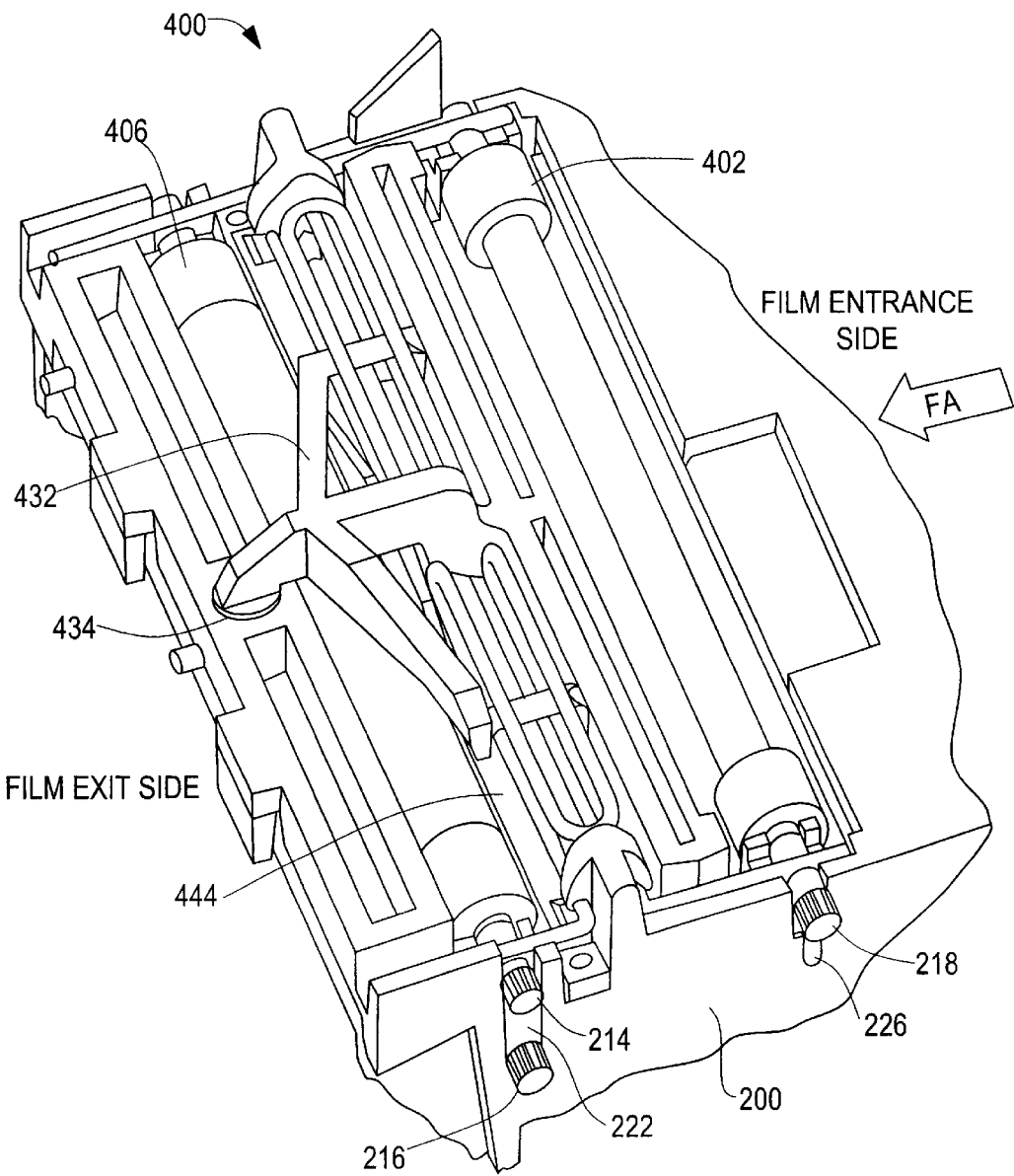
FIG. 13 is a perspective view of the film unit drive and processing fluid spread system sub-assemblies as set in the main frame (partial view) of the electronic printing system.

FIG. 13 illustrates a perspective view of the film unit drive and processing fluid spread system sub-assemblies 400 as set in the main frame 200 of the electronic printing system 1. The journals 214, 216 of the upper spread roller 406 and the lower spread roller 408, respectively, are set in the slot 222 of the main frame 200. Similarly, the journals 218, 220 of the driven transfer roller 402 and the follower transfer roller 404, respectively, are set in the slot 226 of the main frame 200.

Figure 14:
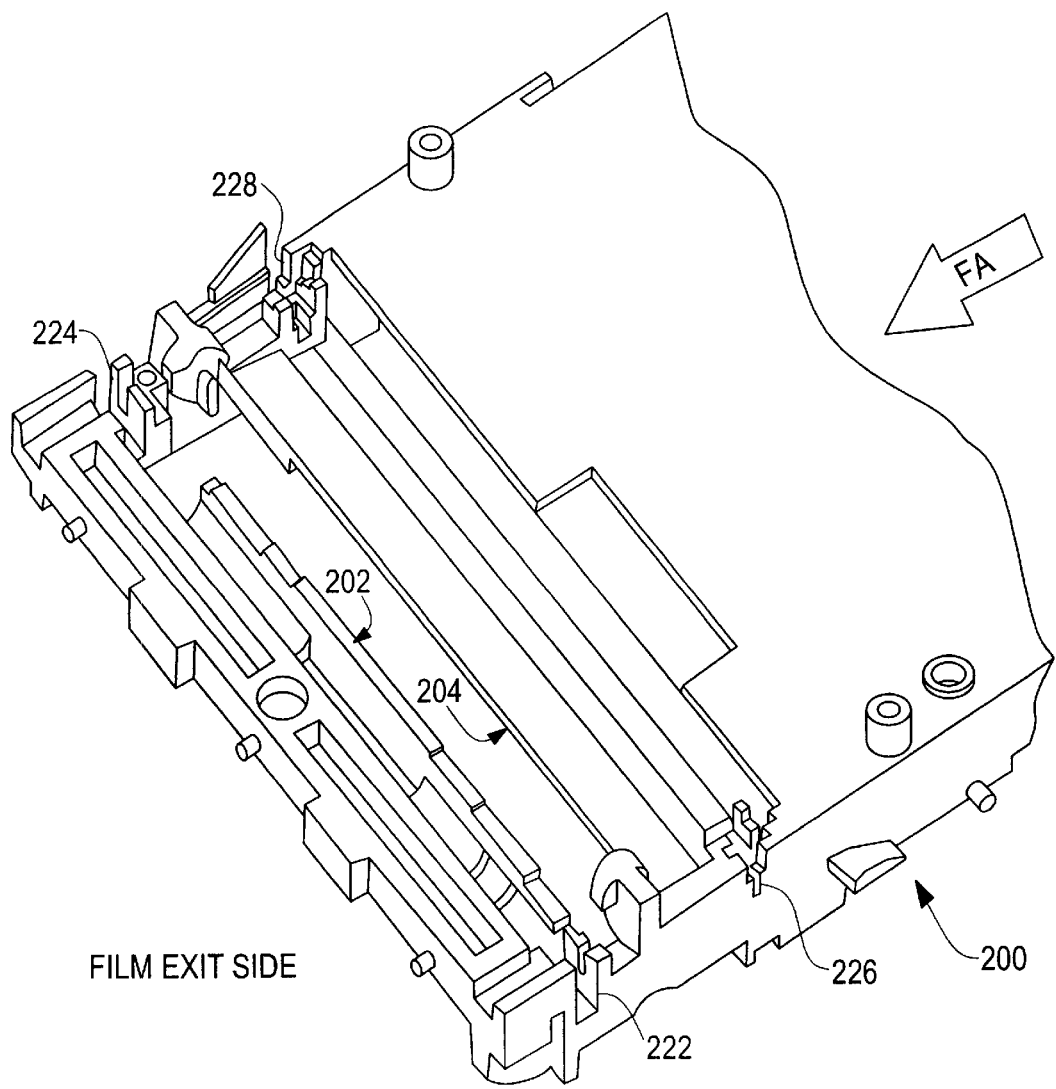
FIG. 14 is a partial perspective view of the main frame as would be viewed from the back wall of the housing, including the lower bow member and the lower clamp member.

FIG. 14 illustrates a (partial) perspective view of the top of the main frame 200 as would can be viewed from the back wall 606 of the housing 600. The main frame 200 includes the lower bow member 202 and the lower clamp member 204, which function to help control the processing fluid of the film unit 500. FIG. 14 illustrates the portions of the lower bow member 202 and the lower clamp member 204 which would contact the film unit 500 as it is advanced over the bow 202 and the clamp 204.

Figure 15:
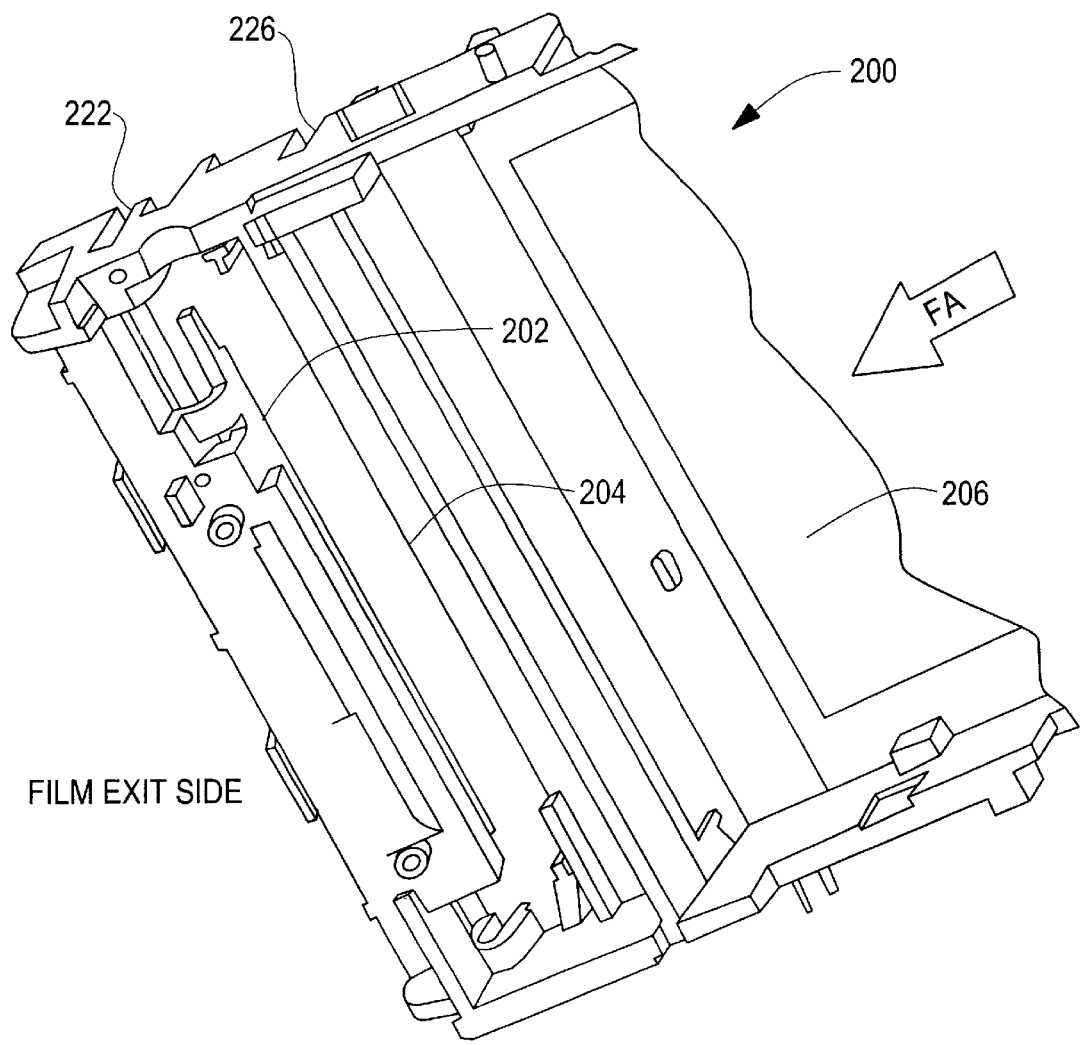
FIG. 15 is an opposite view as illustrated in FIG. 14 showing a (partial) perspective view of the main frame 200 as would be viewed from the front wall of the housing with a partial view of the cassette/door assembly chamber.

FIG. 15 illustrates a (partial) perspective view of the main frame 200 as would be viewed form the front wall 604 of the housing 600 (i.e., opposite view as illustrated in FIG. 14). In particular, FIG. 15 illustrates a partial view of the cassette/door assembly chamber 206 which accommodates the film cassette 518.

Figure 16:
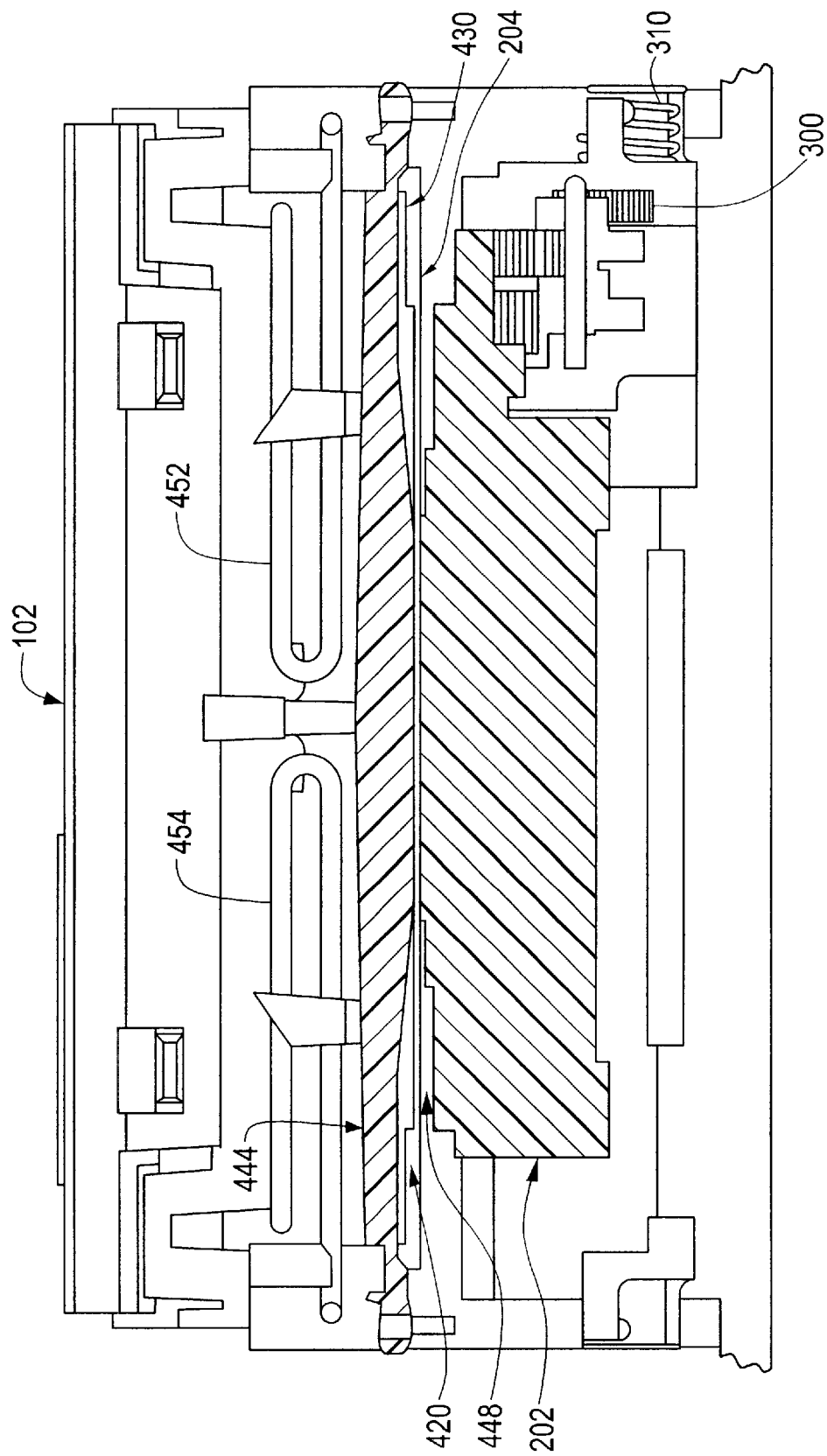
FIG. 16 is a transverse sectional view of the electronic printing system (looking in the direction of the arrows XVI—XVI of FIG. 19) showing a cross section of the lower bow member and the upper bow member with the upper and lower clamp members shown in the background.
Figure 19:
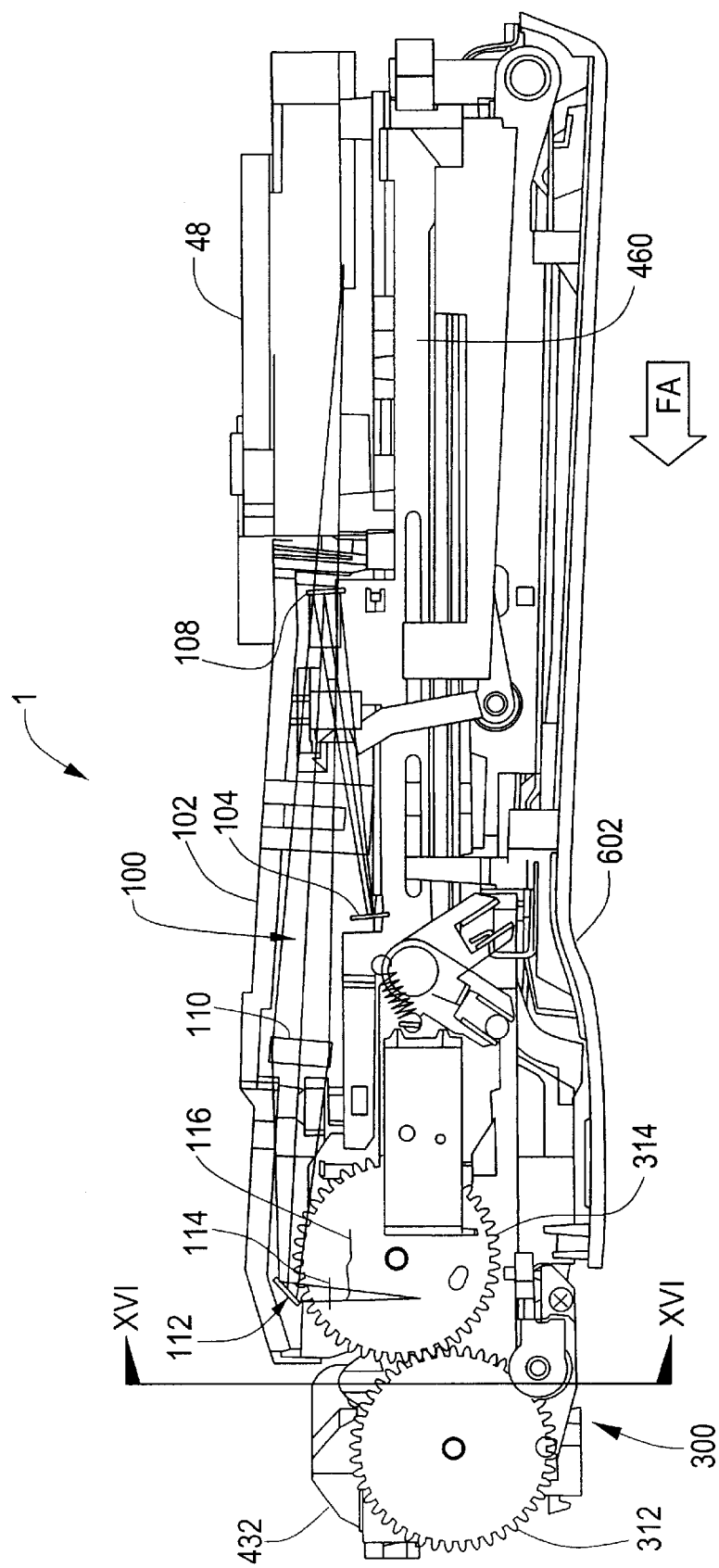
FIG. 19 is an elevation view of the electronic printing system 1 as seen from the gear train assembly side generally showing the optical assembly disposed in the optical assembly housing, the pick mechanism, the film door, and the electronic housing.

FIG. 16 illustrates a cross-sectional view of the electronic printing system 1 for the section taken in FIG. 19. FIG. 16 shows a cross section of the lower bow member 202 and the upper bow member 444. In the background of the upper and lower members 444, 202, there is shown the upper clamp 430 and the lower clamp 204. Accordingly, between the lower bow 202 and the upper bow 444 (vertically as drawn) there is established a bow pre-gap 448 through which the film unit 500 is advanced.

The bow pre-gap 448 has a predetermined numerical distance of approximately 6 to 15 mils (at its center or medial portion) in a preferred embodiment. This range is intended to be illustrative and should not be regarded as restrictive.

Similarly, between the lower clamp 204 and the upper clamp 430 (vertically as drawn) there is established a clamp pre-gap 420 through which the film unit 500 is advanced.

The clamp pre-gap 420 has a predetermined nominal distance of approximately 18–21 miles (at its center or medial portion) in a preferred embodiment. This range is intended to be illustrative and should not be regarded as restrictive.

One can observe that the lower bow has a step-like contour and the upper bow has a contour that is more smoothly tapered. The contour of the lower bow 202 and the upper bow 444 establishes a profile wherein the bow pre-gap 448 is narrowest in the medial or center portions and widest along the outer (off-center) portions and lateral margins.

Next, the lower clamp 204 reveals only a straight line as viewed from this profile and the upper clamp 430 shows only a single step on each side respectively.

Figure 17:
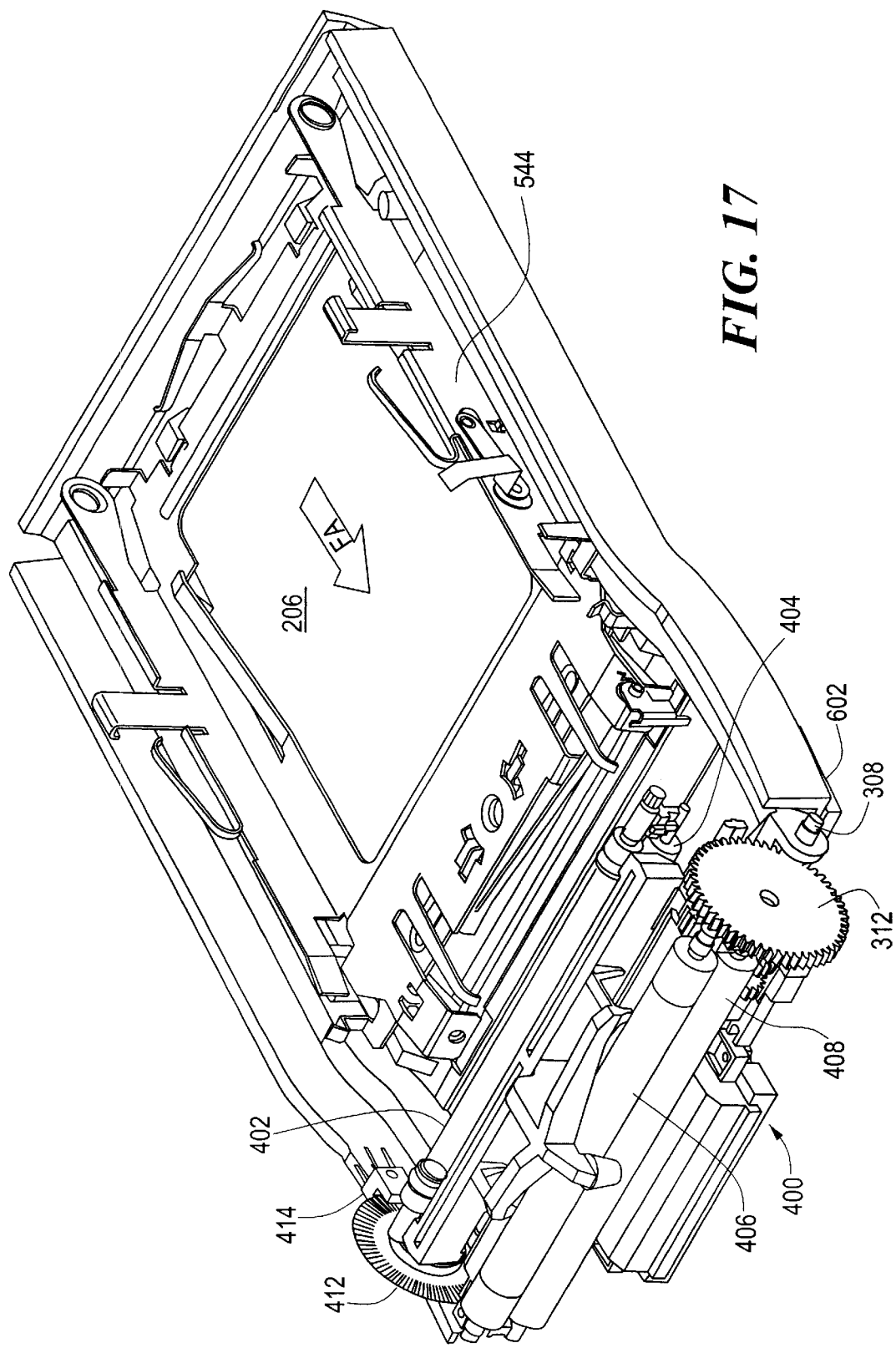
FIG. 17 is a perspective view of the select components from the film unit drives and processing spread system sub-assemblies in relation to the door cassette holder disposed on the film door.

FIG. 17 shows a perspective view of the select components from the film unit drives and processing spread system sub-assemblies 400 in relation to the door cassette holder 544 which is disposed on the film door 602 of the housing 600.

Figure 18:
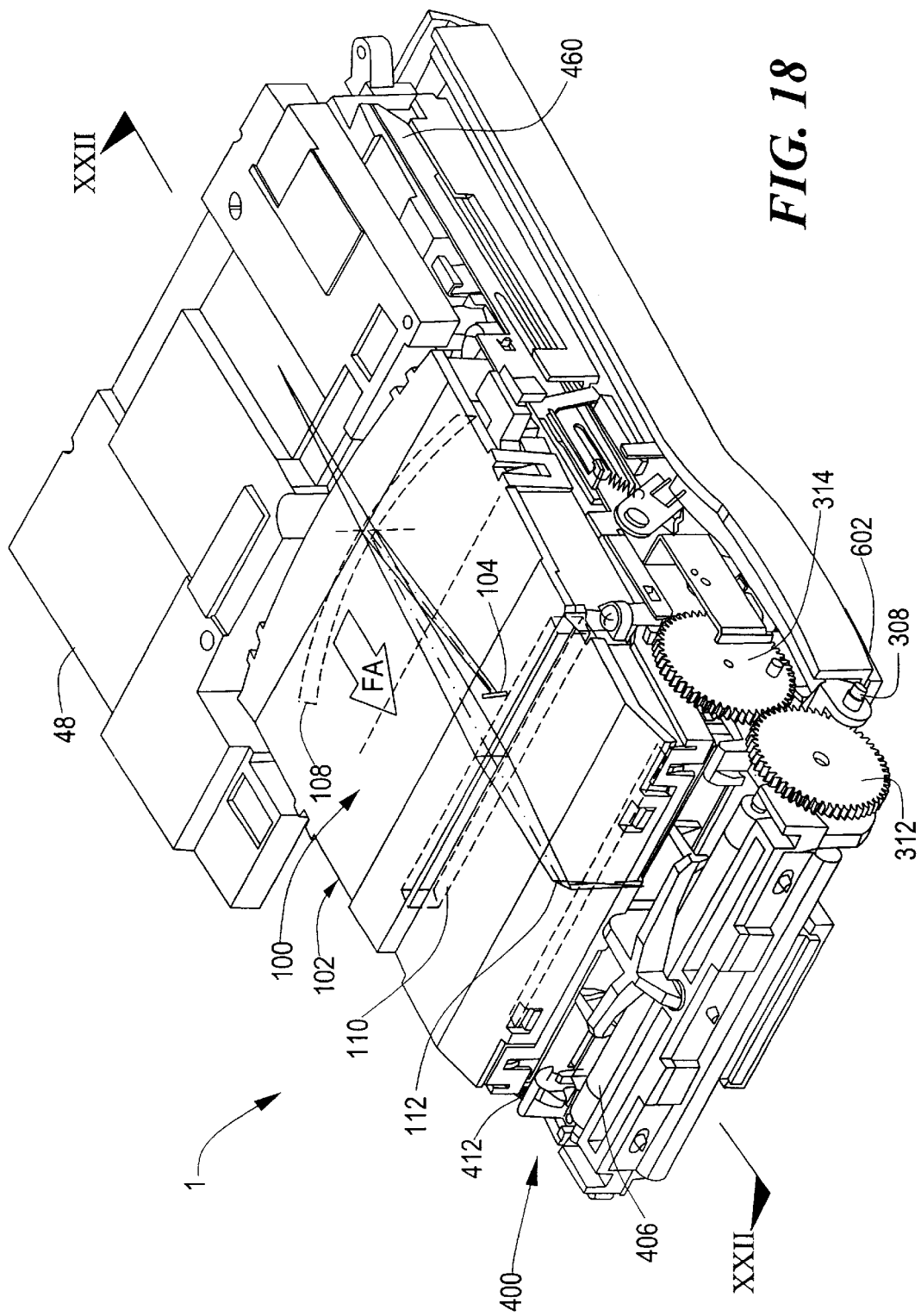
FIG. 18 is a perspective view of the electronic printing system showing the relationship of electronic housing, the optical assembly disposed in the optical assembly housing, the film unit drive and processing fluid spread system sub-assemblies, and the film door.

FIG. 18 is a perspective view of the electronic printing system 1 showing the relationship of electronic housing 48, the optical assembly 100 disposed in the optical assembly housing 102, the film unit drive and processing fluid spread system sub-assemblies 400, and the film door 602.

FIG. 19 is an elevation view of the electronic printing system 1 as seen from the gear train assembly 300 side. This view generally shows the optical assembly 100 disposed in the optical assembly housing 102, the pick mechanism 460, the film door 602, and the electronic housing 48.

Figure 20:
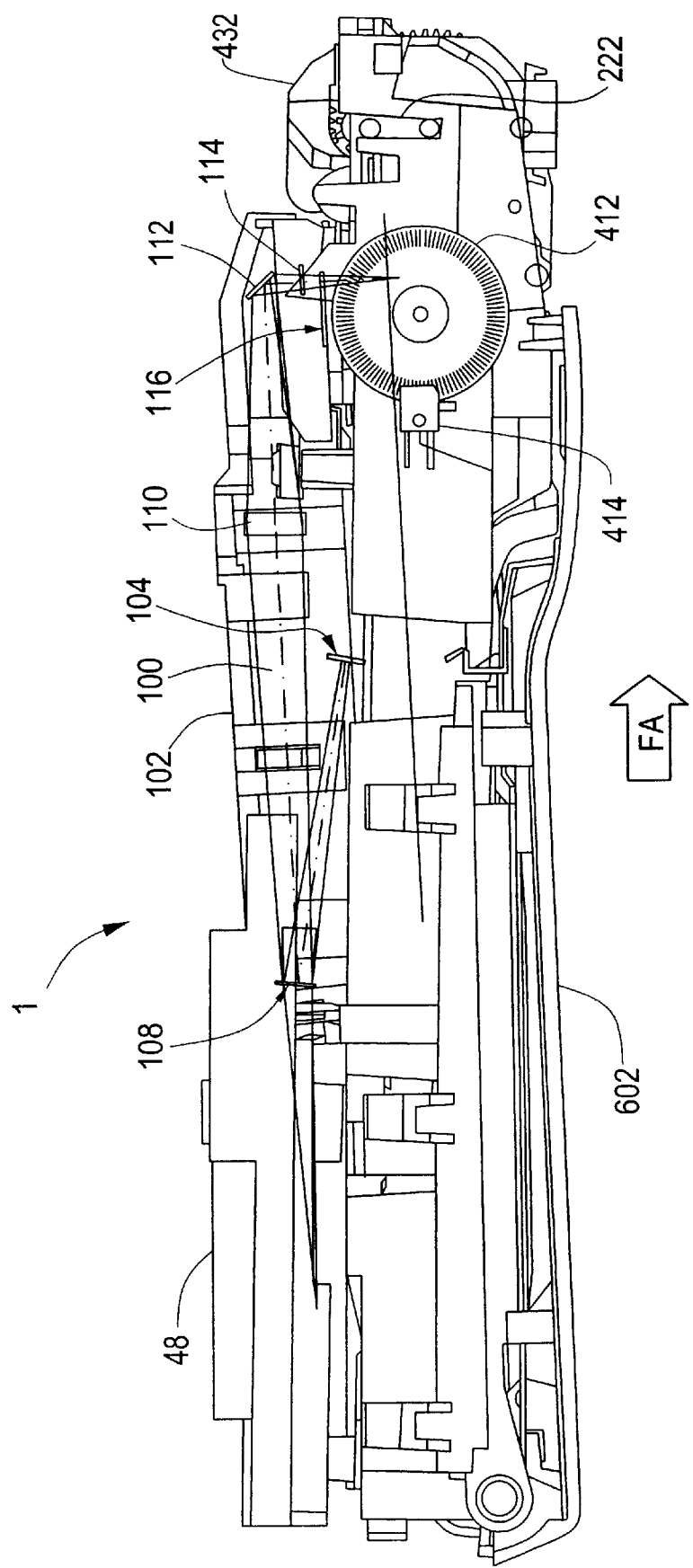
FIG. 20 is an opposite view of FIG. 19 showning an elevation view of the electronic printing system as seen from the encoder wheel side.

FIG. 20 is an elevation view of the electronic printing system 1 as seen from the encoder wheel 412 side (i.e., opposite view of FIG. 19). Also included, is a cross sectional of the optical assembly 100 disposed in the optical assembly housing 102, the electronics housing 48, and the film door 602.

Figure 21:
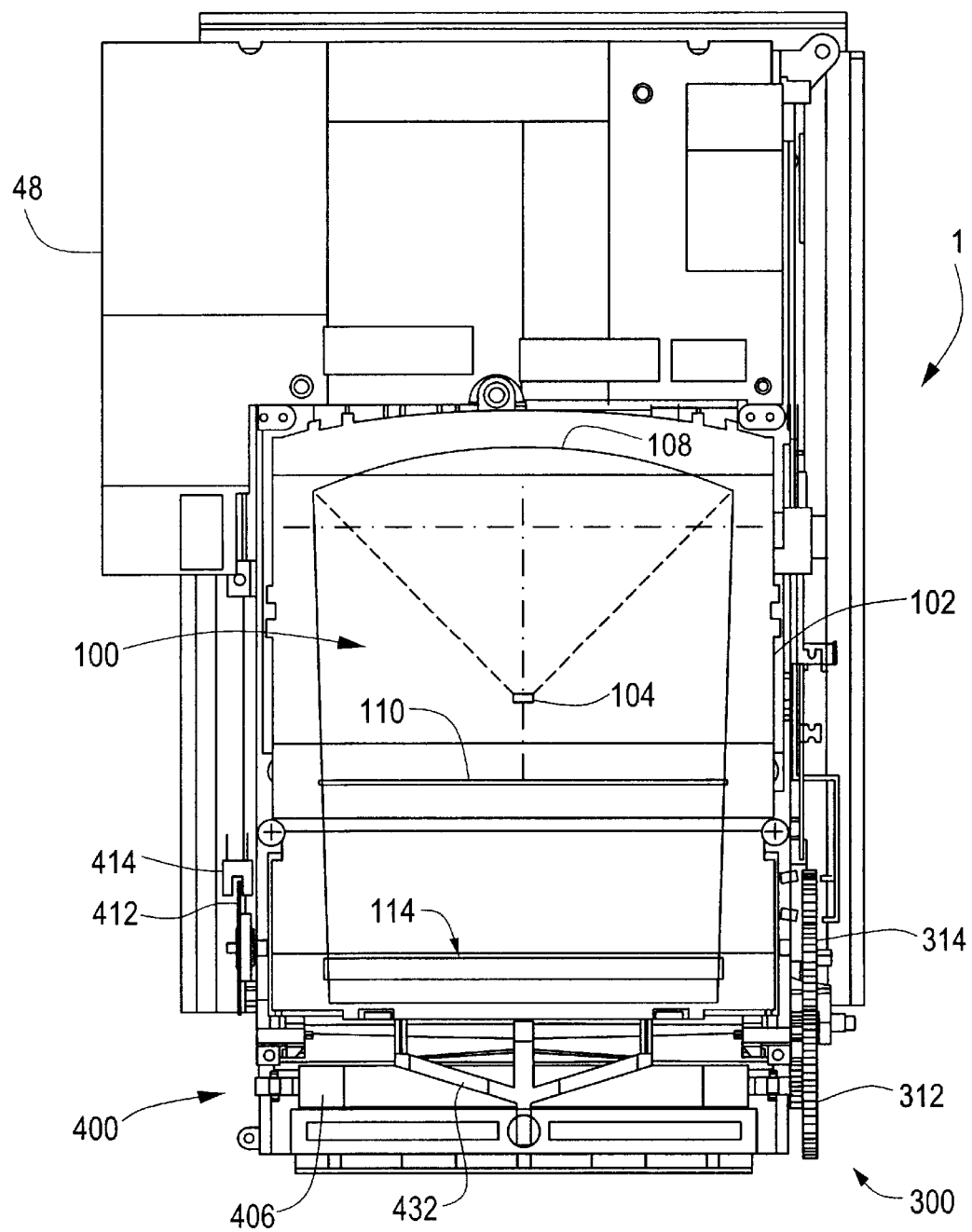
FIG. 21 is a plan view of the electronic printing system as would be viewed from back wall of the housing, including processing fluid spread system sub-assemblies, the electronic housing 48, as well as aspects of the optical assembly 100 disposed in the optical assembly housing 102.

FIG. 21 is a plan view of the electronic printing system 1 as would be viewed from back wall 606 of the housing 600. FIG. 21 shows the film unit drive and processing fluid spread system sub-assemblies 400, the electronic housing 48, as well as aspects of the optical assembly 100 disposed in the optical assembly housing 102.

Figure 22:
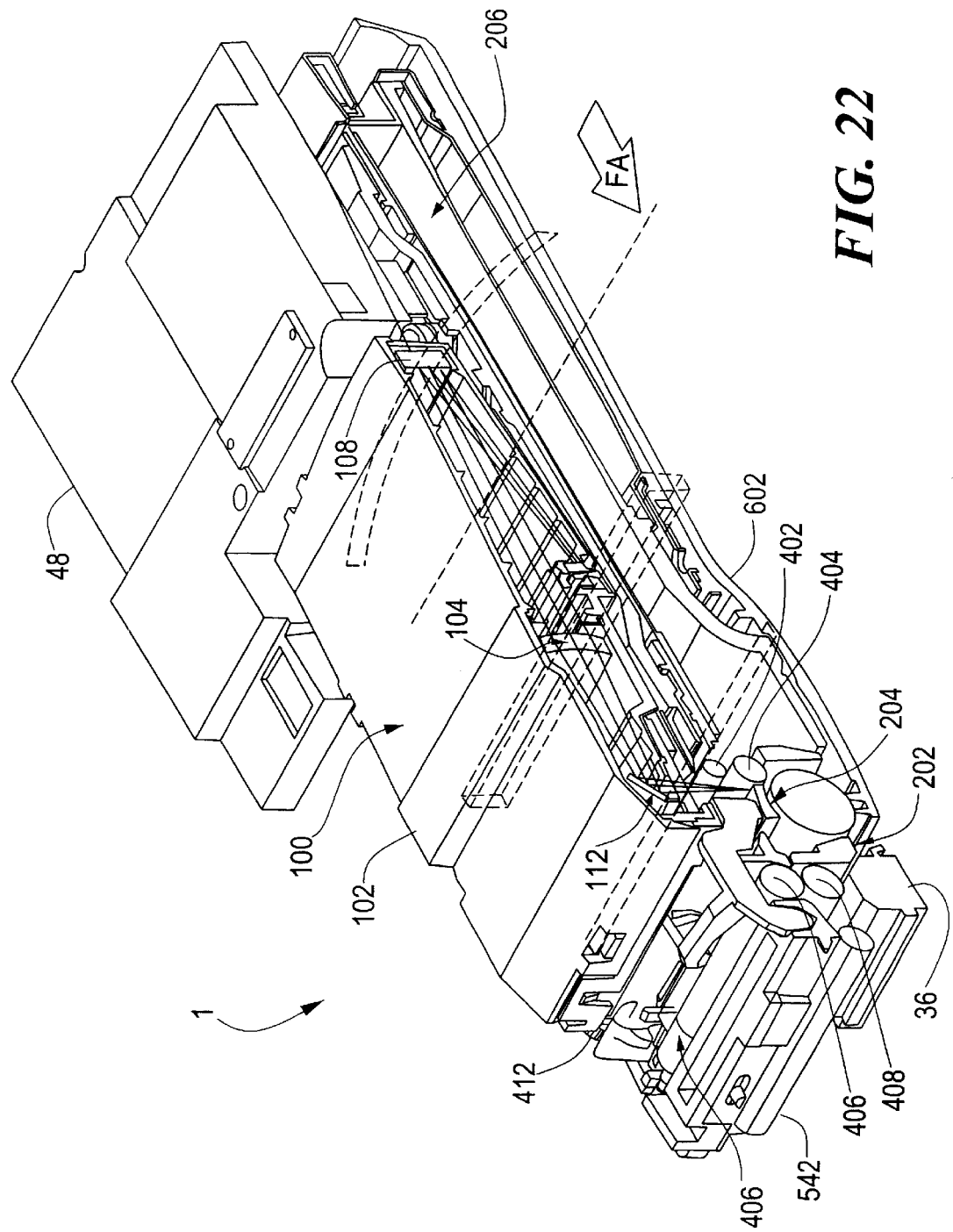
FIG. 22 is a perspective longitudinal sectional view of the electronic housing, (looking in the direction of the arrows XXII—XXII of FIG. 18) showing the optical assembly and the film unit drive and processing fluid spread system sub-assemblies.

FIG. 22 illustrates a perspective cross-sectional view with the electronic housing 48, the optical assembly housing 102 having its optical assembly 100 disposed therein, the film door 600, and the film unit drive and processing fluid spread system sub-assemblies 400.

Figure 23:
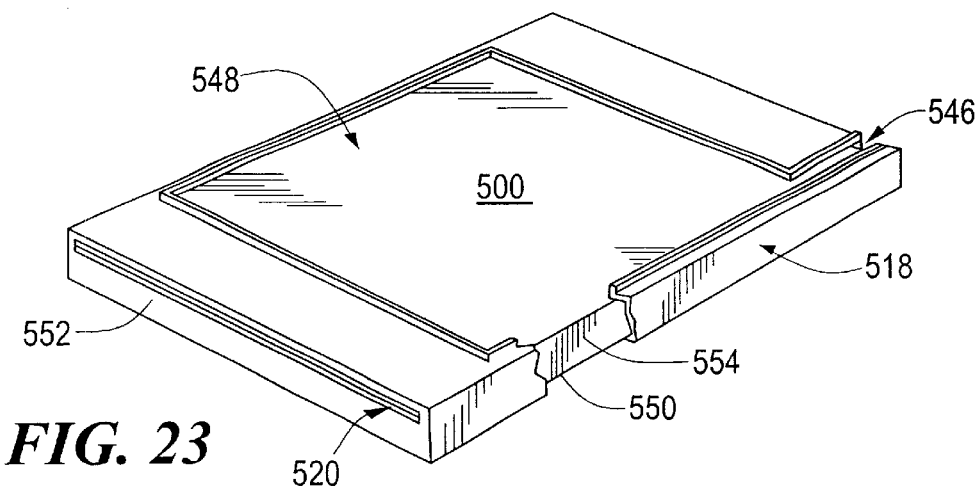
FIG. 23 is a perspective view of the film cassette with a partial cross section showing a stack of film units therein.

FIG. 23 illustrates a film cassette 518 which would be manually loaded into the door cassette holder 544 that is adapted to be disposed on the film door 602. The film cassette 518 is designed for a stack 554 of film units 500. The stack 554 shown in FIG. 23 includes a top film unit 548 and the bottom film unit 550. During operation of the electronic printing system 1, a pick mechanism 460, as known in the art, advances the top film unit 548 through the film withdrawal slot 520 of the front wall 552 of the film cassette 518. The pick mechanism 460 advances the top film unit 548 far enough so as to be engaged within the transfer nip 450 of the driven transfer roller 402 and the follower transfer roller 404 for further advancement.

Figure 24:
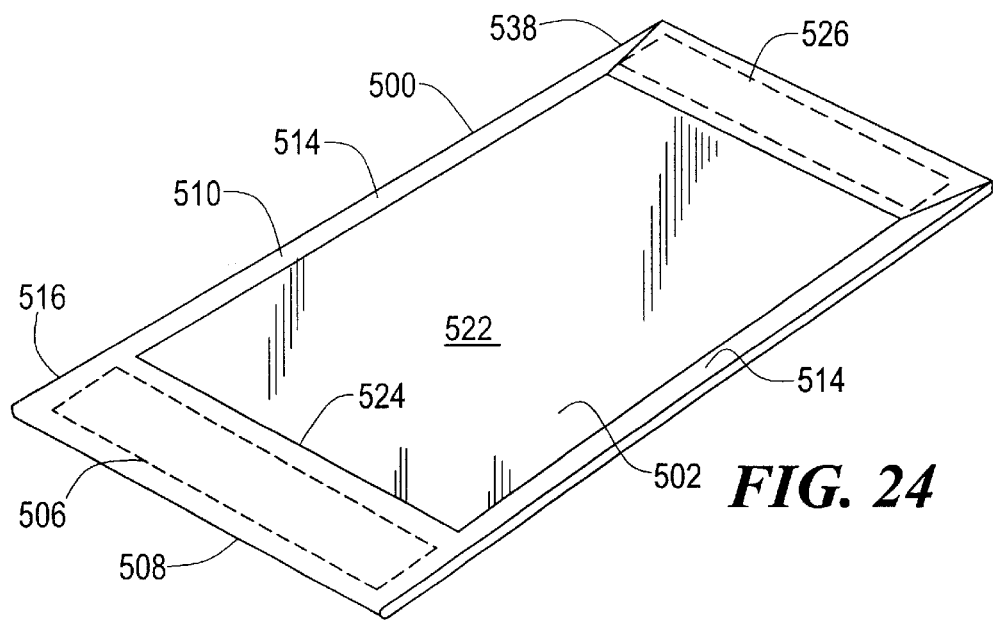
FIG. 24 is a perspective view of a film unit having a leading longitudinal margin, a trailing longitudinal margin, and lateral margins on its respective sides.

FIG. 24 illustrates a perspective view of a film unit 500 having a leading longitudinal margin 516, a trailing longitudinal margin 538, and lateral margins 514 on its respective sides. Also shown is the image forming area 522 of the transparent top sheet 502. The leading edge 508 of the film unit 522 indicates where the film unit enters the transfer rollers 402, 404. The leading longitudinal margin 516 has a rupturable container (pod) 506 disposed therein for containing the processing fluid. The trailing longitudinal margin 538 contains a trap 526 adapted for holding any excess processing fluid therein. The margins collectively serve as a mask 510 defining the aperture for image forming area 522 and serves to bind the top sheet 502 and negative sheet 504 together, as will be discussed in greater detail below.

Next, more particulars will be discussed concerning the preferred embodiment of the film unit drive assembly of the present invention. This preferred embodiment of the present invention as described shall be considered for illustrative purposes and should not be restricted thereto.

As previously discussed in reference to FIGS. 1–24, the optical assembly 100 has a light source such as LEDs 104 for emitting colored light (R, G, & B) toward a cylindrical mirror 108 which is then reflected in a substantially collimated beam (in one direction) toward the cylindrical lens 110. The cylindrical lens 110 causes the substantially collimated beam of light to coverage along one axis where at it is then reflected off the flat mirror 112 and passes through a spatial light modulator such as a liquid crystal shutter (LCS) 114. The stationary print head 118 emits consecutive lines of image data on a self-processable film unit 500 as the film unit 500 is advanced in the direction indicated by arrow FA. The consecutive lines of image data effects lines of exposure 534 on the film unit 500. In essence, the LEDs 104 are activated by the LED driver 106 to provide the light source in cooperation with the LCS 114 that is modulated by the LCS drivers 120 according to the data obtained by the image capture device 44, such as an electronic camera.

With regards to the mechanism for advancing the film unit 500, a pair of transfer rollers comprising a driven transfer roller 402 and a follower transfer roller 404 provide a transfer nip 450 for advancing the film unit 500 along a transfer path between the transfer rollers as indicated by the arrow FA.

The light source is incorporated with the print head 118 such that the print head 118 can emit consecutive lines of image data for exposing the film unit 500 wherein the lines constitute a uniform strip across the film unit 500. The print head 118 remains stationary while the film unit 500 is advanced relatively to the print head 118 and remains in motion to allow for a delayed printing of some of the color information (R, G, B) onto each uniform strip of light. Each of the colors (R, G, B) overlay each other on the same uniform strip exposed of the film unit 500.

The LCS 114 extends across the length of the image forming area 522 of the film unit 500 in a direction perpendicular or transverse to the advancement of the film unit 500 as indicated by arrow FA. Typically, each cell of the LCS 114 is an actionable substance that when an electrical field is placed across an individual cell, the cell transforms between light transmissive and light-blocking states, or can have multiple defined states there between. The LCS 114 performs the modulation of the transmitted light as opposed to the illumination and deillumination of the LEDs 104 respective colors (R, G, B).

The print head 118 configuration provides the means to sequentially register all three colors (R, G, B) of an exposure line on top of each other (within the specified accuracy), so as to minimize color fringing at the edge boundaries. To avoid impulse artifacts, the line-to-line spacing error of the exposure lines should generally not exceed approximately ±5 $\mu$m from the nominal spacing of 120 $\mu$m from center-to-center of each exposed line. In other embodiments the nominal spacing could be reduced to 1 $\mu$m from center to center.

As the film unit 500 is advanced through the film unit drive and processing fluid spread system sub-assemblies 400 the film unit 500 is engaged with the transfer rollers 402, 404 as well as the spread rollers 406, 408. Since the film unit 500 is of flexible material the film unit 500 will be subjected to sheer stress and deformation forces imparted by the various rollers and spreading constraints such as the upper bow 444 and lower bow 202 and the upper clamp 430 and the lower clamp 204.

During the operation of the present invention, if the electronic printing system 1 is to initiate an exposure-fluid spreading cycle then one of the first steps involves a pick-mechanism 460, commonly found in the prior art, that advances the top film unit 500 found in the film cassette 518 far enough so that the film unit 500 comes into engagement with the transfer nip 450, of the transfer rollers 402, 404. The driven transfer roller 402 and the follower transfer roller 404 provide this transfer nip 450 for advancing the film unit 500 along a transfer path between these pair of transfer rollers as indicated by the direction of arrow FA. The driven transfer roller 402 has a circumferential speed as determined by the speed of the motor 302. The driven transfer roller 402 has a transfer roller gear 314 enmeshed with the gear train assembly 300. Unlike the driven transfer roller 402, the follower transfer roller 404 has a circumferential speed as determined by the speed of the film unit 500 being advanced between the transfer rollers 402, 404 along the transfer path.

A pair of spread rollers comprising an upper spread roller 406 and a lower spread roller 408 provides a spread nip 416 for a receiving the leading edge of the film unit 508 as received from the pair of transfer rollers 402, 404 for feeding the film unit 502 between these spread rollers 406, 408 so as to continue the advancement of the film unit 500 along the transfer path, as indicated by arrow FA. The spread roller 406, 408 have a circumferential speed as effected by the speed of the motor 302. In particular, the spread roller gear 312, which is on the same axial as the lower spread roller 408 is enmeshed with the gear train assembly 300. The spread roller gear 312 has a compound gear that drives the upper spread roller 406. Also, the spread roller gear 312 is enmeshed with the transfer roller gear 314 which is on the axial of the driven transfer roller 402 for supplying drive power thereto as discussed above.

Using motor encoder 318 (not shown) the speed of the motor 302 can be maintained within plus or minus 5% of the nominal motor speed. For purposes of illustration, and not intended to be restrictive, the motor speed may operate at two speeds, one will be 3,658 RPM throughout the imaging time of the film unit 500 and the other open loop speed for advancing the dark slide, and returning the pick mechanism 460 home is approximately 6,500 RPM.

With regards to film advancement/transport requirements, the spread rollers 406, 408 and the driven transfer roller 402 will have a circumferencial speed or linear speed of approximately 0.37 inches per second. This rate should be considered illustrative for purposes of discussing the embodiments herein. Various ranges that may be approximate to this specified rate (either greater or lesser) should be included as well. For example, any rate greater than 0.1 inches per second would be applicable.

Figure 25:
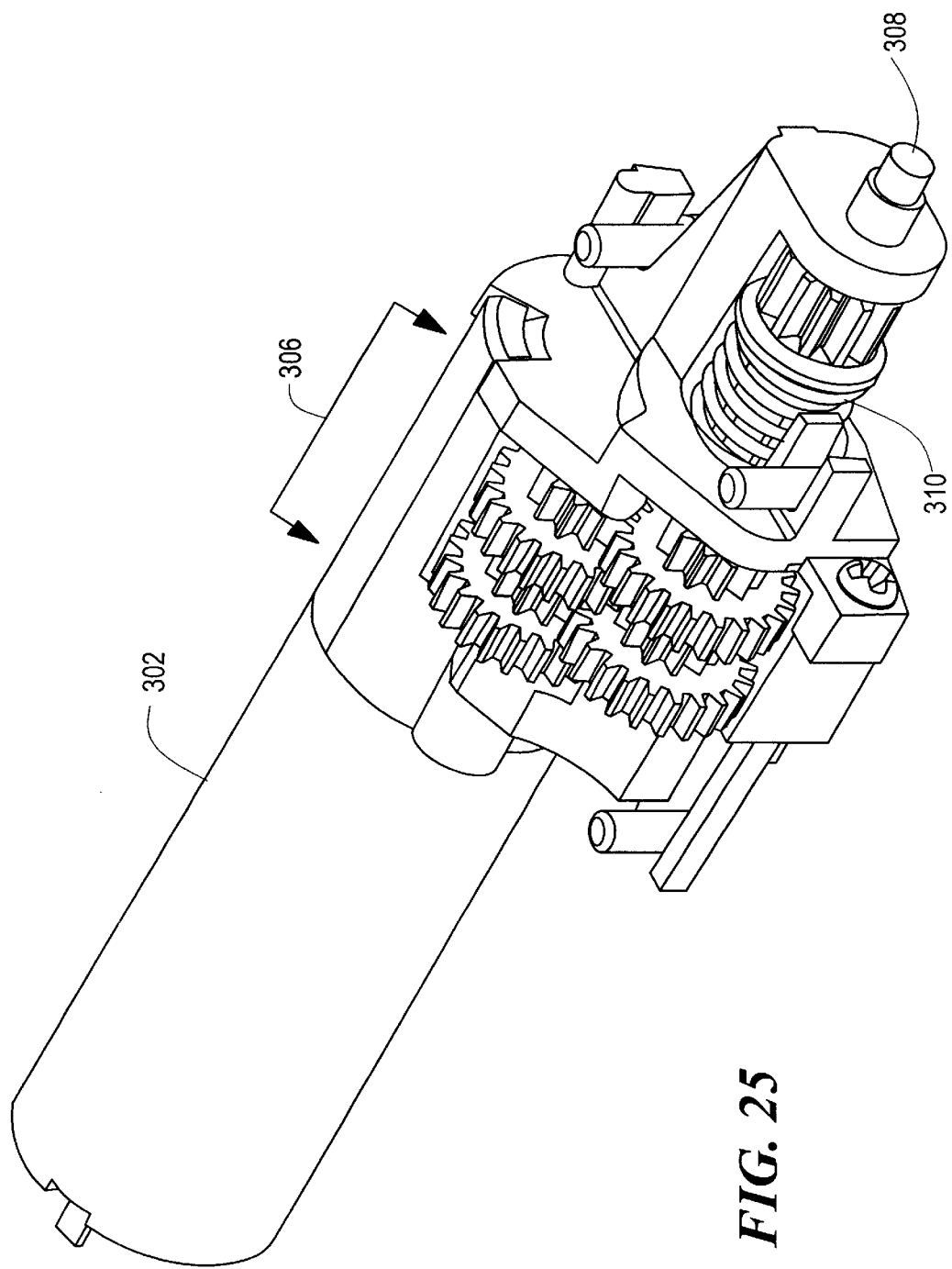
FIG. 25 is a perspective view of the motor 302 with related components.

FIG. 25 illustrates the motor 302 having four sets of gear compounds 306, a spring coil disengagement 310 and a gear motor pinion 308. The motor 302 and associated gears are enmeshed with the gear train assembly 300. Particularly, the spread roller gear 312 which is on the same axial as the lower spread roller 408. The spread roller gear 312 has a compound gear that drives the upper spread roller 406. The spread roller gear 312 is enmeshed with the transfer roller gear 314 on the axial of the driven transfer roller 402 for supplying drive power thereto.

Figure 26:
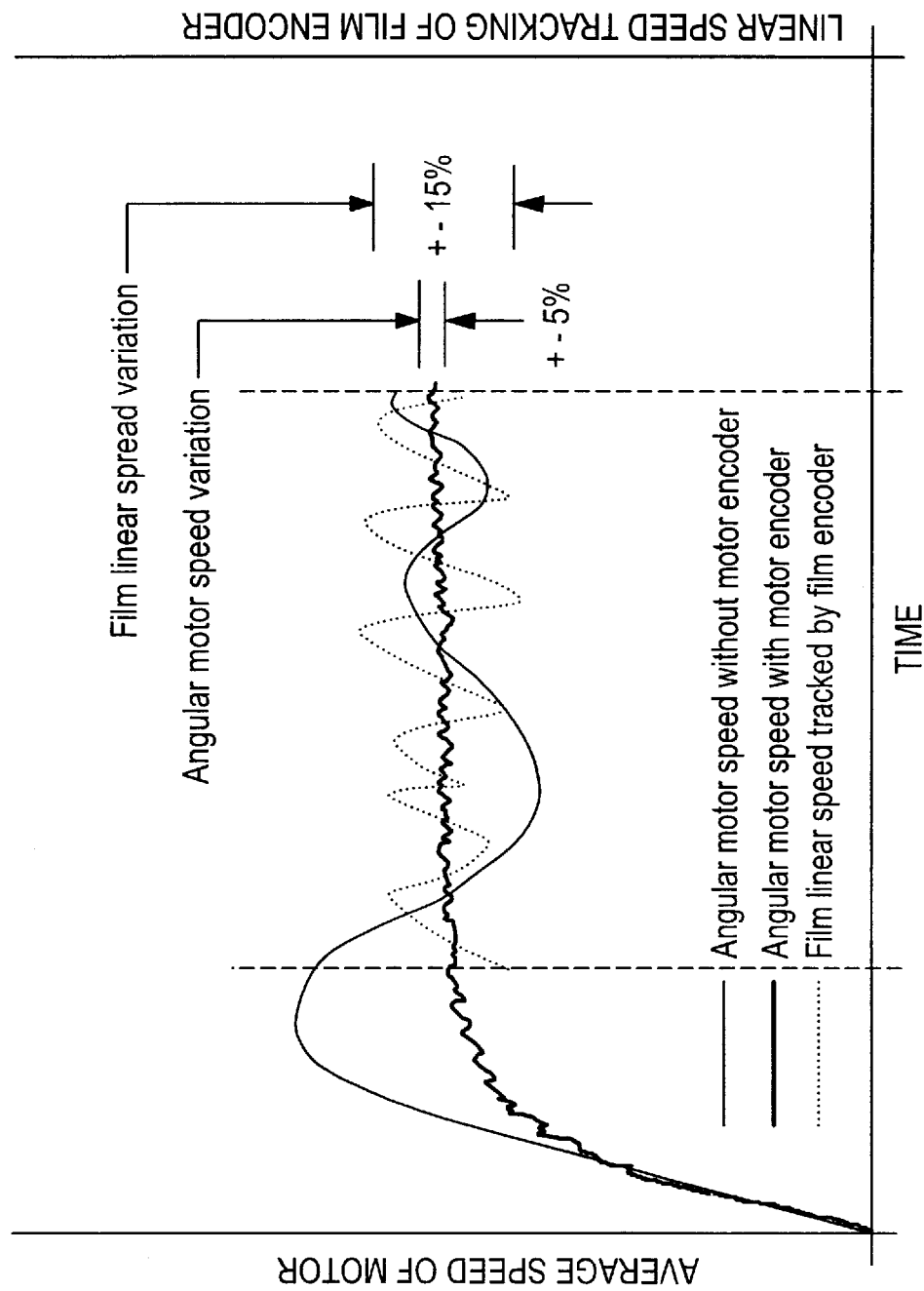
FIG. 26 is a graph illustrating the relationship of the angular motor speed variation with the motor encoder versus the film linear speed variation as tracked by the film follower encoder.

Referring to FIG. 26, FIG. 26 is provided as an illustrative graph to compare the amount of control which the motor encoder 318 (not shown) provides as compared to the amount of linear tracking that the film encoder 410 provides. The motor encoder 304, which is directly connected to the output shaft of the motor 302, is used in a feedback loop to control the angular speed of the motor 302. While film is moving through the system, the motor speed is maintained within in a predetermined rate of approximately +/−5 percent of the nominal angular speed. However because of the errors in the collection of gears and deformations and interferences imparted by the film unit, the angular velocities of the transfer rollers 402,404 and spread rollers 406, 408 (and therefore the linear speed of the film unit 500) are maintained within a predetermined nominal rate of only approximately +/−15 percent. This large linear speed variation is allowable because the film follower encoder 410 is able to track the exact position of the film unit 500. A primary system attribute needed to prevent image artifacts is the system's ability of exposing the print lines in their correct position. Image artifacts are prevented when the image lines are emitted in the correct positions. Because the film follower encoder 410 is able to track the exact position of the advancing film unit, the linear speed variation, as discussed above, is allowable. However, the linear film speed variation does create image artifacts, but only when the speed variation is at a large enough threshold. With normal speed variations, the linear film speed variation provides only a low order effect on image artifact visibility.

In an alternative embodiment, the DC motor 302 may be substituted with a stepper motor. For the stepper motor embodiment, the motor speed is controlled not by a feedback loop but rather through the stepper motor drive circuitry as is well known in the art.

Further yet, in another embodiment the system configuration uses only the film follower encoder 410 to provide feedback for both the film unit position and the motor angular speed (i.e., without a motor encoder). However, due to the runout and backlash errors in a typical gear train, the resulting film speed variation is much greater than the acceptable range of +/−15 percent and thus image artifacts become intolerable. These image artifacts can be minimized at the expense of a more accurate gear train. Also, to provide proper electrical characteristics to the motor control feedback circuit, the resolution of the film follower encoder 410 may need to be increased, thereby further increasing the cost of the system.

Finally, in another embodiment the system configuration does not use a motor speed control circuit. But rather film follower encoder 410 is used solely to provide film position information. As described above, this configuration is acceptable as long as the resulting film speed variation stays within an acceptable range.

Of course, an AC motor can be substituted for the DC motor in the above discussed embodiments.

The film follower encoder 410 is in communication with the follower transfer roller 404 (as the encoder is mounted on the axial of the follower transfer roller) so as to measure the circumferential movement or linear speed of the follower transfer roller 404, as determined by the film unit 500 being advanced between the transfer rollers 402, 404. Since the circumferential movement of the follower transfer roller 404 essentially corresponds with the advancement of the film unit 500, the position of the film unit 500 with respect to the print head 118 can be accurately calculated so as to enable a successful exposure cycle.

During advancement, once the leading edge of the film unit 508 advances from the pair of transfer rollers 402, 404 along the transfer path and engages the spread nip 416 of the pair of spread rollers 406, 408 then the image forming area 522 of the film unit 500 can then begin to be progressively exposed by the print head 118. The print head 118 emits consecutive lines of image data on the image forming area 522 to progressively expose lines on the advancing film unit 500. The exposed lines are separated by a pre-determined distance, for example 120 μm center-to-center spacing. This spacing should be considered illustrative for purposes of discussing the embodiments herein. Various ranges that may be approximate to this specified spacing rate (either greater or lesser) should be included as well.

As mentioned previously, the film unit 500 is of the type including a pair of sheet elements 502, 504 and a rupturable container or pod 506 containing processing fluid which is positioned adjacent to the leading edge of the film unit 508 in the leading longitudinal margin 516. The spread rollers 406, 408 are also utilized for spreading the processing fluid in a thin layer between the sheet elements 502, 504 while the film unit 500 is advanced between the spread rollers 406, 408. As disclosed in commonly assigned U.S. patent application Ser. No. 09/495,025, entitled "Processing Fluid Spread System For An Electronic Photographic Printer and Camera and Related Method Thereof", the pair of spread rollers 406, 408 apply a first constraint 68, as well as bow members 202, 204 and clamp members 204, 430 applying further constraints (second constraint 50 and third constraint 52, respectively). As such, the advancing film unit 500 is subjected to sheer stress forces and deformation forces that are incidentally caused by the spreader rollers 406, 408, the transfer rollers 402, 404, bow members 202, 204, and clamp members 204, 430.

By having the film unit engaged in both the transfer rollers 402, 404 and the spread rollers 406, 408, the two pairs of rollers can act in conjunction so as to minimize any hesitations that would otherwise occur while the film unit 500 initially enters the spread rollers 406, 408 at the spread nip 416. Nevertheless, because of the stress that is imparted on the film unit 500, while it is being advanced, the nominal speed of the film unit can only be maintained within approximately plus or minus 15% accuracy. Therefore, the film follower encoder 410, communicates to the microprocessor unit (MPU)-system controller 30 the position and the timing of the film unit 500 with respect to the print head 118. This allows the LEDs 104 to be activated by the LED driver 106 to provide the light source (R, G, B) in cooperation with the LCS 114 of the print head 118 so as to be modulated by the LCS drivers 120 in accordance to the data obtained by the image capture device 44 and the data of the relative location of the film unit 500 in respect to the position of the print head 118 or the LCS 114. This also allows the print head to find the accurate location of the line spaces on the film unit 500 for exposure. This print head configuration and control provides the means to register all three colors (R, G, B) of a line on top of each other with such high accuracy so as to avoid any kind of impulse artifacts that typically would have been associated with line-to-line spacing errors of prior art devices.

In summary, the embodiments of the present invention described above provide a number of significant advantages. For instance, the present invention provides a readily portable imaging system for use in the field and, more particularly, to an electronic camera and electronic printer housed and readily connectable with respect to each other in the field, and wherein the electronic printer comprises a film unit drive assembly that advances the film unit (self-developing type) past a stationary print head that emits consecutive lines of image data on the film unit to effect progressive exposure on the film unit simultaneously as a fluid spread system spreads the processing fluid over the film unit to effect processing of exposed portions of the film unit.

Another advantage of the present invention film unit drive assembly is that it provides an accurate system of advancing or driving the film unit while the print head emits consecutive lines of the image data for accurately exposing the film unit, with regular spacing of at least 1 μm center-to-center spacing.

A further advantage of the present film unit drive assembly is that it can minimize the mechanical errors and the film medium deformations and interferences or hesitations imparted by the drive assembly system itself, as well as imparted by the fluid processing spread system.

Additionally, another advantage of the present invention is that it provides a compact and portable handheld imaging system comprising both an electronic camera and electronic photographic printer separately housed and readily interconnectable for selective use either together or apart.

Still further, another advantage of the present invention is that it is able to monitor the position of the advancing film unit in light of any residual mechanical errors and the film media deformations and interferences that may still persist.

Moreover, another advantage of the present invention is that LEDs in cooperation with a Spatial Light Modulator (SLM) of a print head provides the image data obtained by the image capture device. Also, the data of the relative location of the film unit with respect to the position of the print head is also determined. This also allows the print head to find the accurate location of the line spaces on the film unit for exposure, whereby the print head configuration and control system provide the means to register all three colors (R, G, B) of a line on top of each other with such high accuracy so as to avoid any kind of impulse artifacts that typically would have been associated with line-to-line spacing errors of prior art devices.

Still yet, another advantage of the present invention is that it is efficient in size and power requirements since the processing and exposing is simultaneously combined during operation. As a result, the system is also cost effective to manufacture. Finally, the system is readily portable for the user to carry.

Thus, an advantage of the present invention is that it provides a compact and portable handheld imaging system comprising an electronic camera and electronic printer useable either apart or in connection with respect to each other wherein the printer can provide a high quality photographic print of the image recorded in the camera; wherein the stationary print head effects progressive exposure on the advancing film unit simultaneously as the fluid spread system spreads the processing fluid over the film unit to effect processing of exposed portions of the film unit.

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced herein.

We claim:

1. A portable imaging system comprising an electronic camera for capturing images, disposed in a camera housing of a size that is conveniently carried by hand and said imaging system comprising an electronic printer disposed in printer housing also of a size that is conveniently carried by hand and that is distinct and detachable from said camera housing, wherein said printer includes a film unit drive system and a stationary print head suitable for emmitting consecutive lines of an image data on a self-processable film unit to expose said film unit at its image forming area, wherein the lines exposed on said film unit are separated by a predetermined distance, and wherein said exposure occurs while said film unit is being advanced along a transfer path proximately to said print head, wherein said imaging system further comprises:

complementary releasable connecting means operatively associated with respect to said camera housing and said printer housing for effecting a releasable fixed connection between said camera housing and said printer housing, said fixed connection also operating to effect an electrical connection between said camera, film unit drive system, and said printer;

memory storage means for storing the image data for each of said camera and said printer; and a microprocessor unit having portions disposed respectively within said camera housing and said printer housing, said microprocessor being responsive to user selection for acquiring image data via said camera, said microprocessor operable to process said image data for memory storage and film unit exposure and processing; and wherein said film unit drive system further comprises:

a motor mounted to the housing;

a pair of transfer rollers comprising a driven transfer roller and a follower transfer roller to provide a transfer nip for advancing said film unit along a transfer path between said pair of transfer rollers, said driven transfer roller having a circumferential speed as effected by the speed of said motor, and said follower transfer roller having a circumferential speed as determined by the speed of the film unit being advanced between said transfer rollers along the transfer path;

a pair of spread rollers comprising an upper roller and lower roller to provide a spread nip for receiving the leading edge of said film unit received from said transfer rollers and for feeding said film unit between said pair of spread rollers to continue the advancement of said film unit along the transfer path, said spread rollers having circumferential speed as effected by the speed of said motor;

a gear train that couples said motor to at least one of said spread rollers and to said driven transfer roller for transmitting power from said motor to at least one of said spread rollers and to said driven transfer roller to cause said spread rollers and transfer rollers to rotate and advance said film unit along the transfer path;

a drive motor encoder in communication with said motor to control the motor speed so as to affect the circumferential speed of said driven transfer roller and said spread rollers;

a film follower encoder in communication with said follower transfer roller to measure the circumferential movement of said follower transfer roller, as determined by the speed of the film unit being advanced between said transfer rollers, whereby the circumferential movement of said follower transfer roller corresponds with the advancement of the film unit whereby its position respective to said print head can be determined; and said print head being proximally located to said transfer rollers whereby once the leading edge of said film unit advances from said transfer rollers along the transfer path and engages the spread nip of the spread rollers said image forming area of said film unit is then exposed by said print head, wherein said print head emits consecutive lines of image data on said image forming area while said film unit continues to advance, and wherein the exposed lines on said film are separated by the predetermined distance.

2. The imaging system of claim 1, wherein the film unit is of the type including a pair of sheet elements and a rupturable container of processing fluid positioned adjacent the leading edge of the film unit, and whereby said spread rollers are also adapted for spreading the processing fluid in a thin layer between the sheet elements while said film unit is advanced between said rollers, said spread rollers comprise:

an elongated spreader gap, as defined by said spread nip, through which the film unit is advanced with the sheet elements in superposed relationship so as to apply a constraint to the film unit to first rupture the container to release the processing fluid and then to cause the released mass of processing fluid to flow downstream between the sheet elements opposite to the direction of advancement of the film unit through said spread gap such that the processing fluid is progressively deposited between the sheet elements as a thin layer extending over a pre-selected area of the sheet elements.

3. The system of claim 2, wherein the preselected area comprises the image forming area that has been exposed by said exposure station.

4. The system of claim 1, wherein the speed of advancement of said film unit as determined by said transfer rollers and spread rollers is approximately 0.37 inches per second.

5. The system of claim 1, wherein the exposed lines on said image forming area, resultant from the consecutive lines of image data emitted by said print head, have about a 120 $\mu$m center-to-center spacing.

6. The system of claim 1, wherein the film unit drive mechanism further comprises a pick mechanism for transporting said film unit into engagement with the transfer nip.

7. The system of claim 1, wherein said print head comprises:

a plurality of light emitting diodes (LEDs) that are activated to supply a light source for exposing the image forming area; and a liquid crystal shutter (LCS) that is modulated, in cooperation with said LEDs, to create proper exposure level on the image forming area.

8. The system of claim 7, wherein said plurality of LEDs and said LCS are configured to provide means to sequentially emit a plurality of colors for each of said consecutive image lines exposed on said image forming area.

9. The system of claim 1, wherein film follower encoder comprises:

an encoder wheel connected to the axial of said follower transfer roller; and an optical sensor in communication with said encoder wheel, wherein said optical sensor measures the circumferential movement of said follower transfer roller.

10. The system of claim 1, wherein the exposed lines on said image forming area, resultant from the consecutive lines of image data emitted by said print head, have a predetermined spacing, wherein said predetermined spacing is constant and is at least 1 $\mu$m.

11. The system of claim 1, wherein the speed of advancement of said film unit as determined by said transfer rollers and spread rollers is at least 0.1 inches per second.

* * * * *